US012697816B2

(12) United States Patent
Ishii et al.

(10) Patent No.: US 12,697,816 B2
(45) Date of Patent: Aug. 4, 2026

(54) INK JET RECORDING METHOD AND INK JET RECORDING APPARATUS

(71) Applicant: CANON KABUSHIKI KAISHA, Tokyo (JP)

(72) Inventors: Tomoaki Ishii, Saitama (JP); Tomohiro Yamashita, Kanagawa (JP); Hiroshi Kakikawa, Kanagawa (JP); Kenichi Shiiba, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 18/337,778

(22) Filed: Jun. 20, 2023

(65) Prior Publication Data

US 2023/0405993 A1      Dec. 21, 2023

(30) Foreign Application Priority Data

Jun. 20, 2022    (JP) ................................. 2022-098876
Jun. 14, 2023    (JP) ................................. 2023-097947

(51) Int. Cl.
*B41J 2/145*         (2006.01)
*C09D 11/32*        (2014.01)

(52) U.S. Cl.
CPC ............... *B41J 2/145* (2013.01); *C09D 11/32* (2013.01)

(58) Field of Classification Search
CPC ... C09D 11/328; C09D 11/322; C09D 11/101; C09D 11/17; C09D 11/30; C09D 11/38; C09D 11/32; C09D 11/40; B41J 3/4078; B41J 2/01; B41J 2/2107; B41J 2/135; C09B 67/0041; B41M 7/009; B41M 5/0023
See application file for complete search history.

(56) References Cited

U.S. PATENT DOCUMENTS

| | | | |
|---|---|---|---|
| 7,160,372 B2 | 1/2007 | Yoshizawa |
| 7,226,498 B2 | 6/2007 | Yamashita |
| 7,247,194 B2 | 7/2007 | Okamura |
| 7,270,701 B2 | 9/2007 | Jinnou |
| 7,297,197 B2 | 11/2007 | Jinnou |
| 7,550,037 B2 | 6/2009 | Mafune |
| 7,611,571 B2 | 11/2009 | Yamashita |
| 8,075,126 B2 | 12/2011 | Yoshizawa |
| 8,616,695 B2 | 12/2013 | Mori |

(Continued)

FOREIGN PATENT DOCUMENTS

| | | |
|---|---|---|
| JP | 2000303008 A | 10/2000 |
| JP | 2018187921 A | 11/2018 |

*Primary Examiner* — John P Zimmermann
(74) *Attorney, Agent, or Firm* — Venable LLP

(57)        ABSTRACT

Provided is an ink jet recording method including using an ink jet recording apparatus, the ink jet recording apparatus including: an aqueous ink containing resin particles each dyed with a fluorescent dye. A plurality of nozzle arrays include a first nozzle array and a second nozzle array arranged in a predetermined direction so as to be displaced from each other in such a manner that end nozzles in the nozzle arrays adjacent to each other form an overlapping portion in a direction intersecting the predetermined direction. The aqueous ink is ejected from overlapping nozzles at the overlapping portion while the nozzles are allocated to the first nozzle array and the second nozzle array. An application time difference of the aqueous ink ejected from the overlapping nozzles is 20 milliseconds or less.

12 Claims, 7 Drawing Sheets

(56)  References Cited

U.S. PATENT DOCUMENTS

| | | | |
|---|---|---|---|
| 8,998,397 B2 | 4/2015 | Mori | |
| 9,169,413 B2 | 10/2015 | Shiiba | |
| 9,388,322 B2 | 7/2016 | Kakikawa | |
| 9,452,608 B2 | 9/2016 | Okamura | |
| 9,499,708 B2 * | 11/2016 | Banning | C09D 11/50 |
| 9,562,165 B2 | 2/2017 | Mori | |
| 9,574,099 B2 | 2/2017 | Kawabe | |
| 9,724,940 B1 * | 8/2017 | Ueki | C09D 11/38 |
| 9,809,721 B2 | 11/2017 | Yamamoto | |
| 9,957,399 B2 | 5/2018 | Okazaki | |
| 10,233,343 B2 | 3/2019 | Takebayashi | |
| 10,240,053 B2 | 3/2019 | Nushiro | |
| 10,253,197 B2 | 4/2019 | Shiiba | |
| 10,253,200 B2 | 4/2019 | Kakikawa | |
| 10,259,963 B2 | 4/2019 | Masada | |
| 11,654,693 B2 | 5/2023 | Saito | |
| 2002/0198289 A1 * | 12/2002 | Gummeson | C09D 11/101 |
| | | | 523/400 |
| 2005/0107492 A1 * | 5/2005 | Sukhna | C09D 11/16 |
| | | | 523/160 |
| 2005/0190248 A1 * | 9/2005 | Konno | B41J 11/0015 |
| | | | 347/42 |
| 2017/0165966 A1 * | 6/2017 | Ito | B41J 2/14233 |
| 2019/0121231 A1 * | 4/2019 | Traub | G03F 7/0002 |
| 2019/0381791 A1 * | 12/2019 | Goto | C09D 11/328 |
| 2021/0252873 A1 * | 8/2021 | Ando | B41J 2/2117 |
| 2021/0277262 A1 * | 9/2021 | Hasegawa | B41J 2/17509 |
| 2022/0024218 A1 | 1/2022 | Yamashita | |
| 2022/0024219 A1 | 1/2022 | Motomura | |
| 2022/0184970 A1 | 6/2022 | Kusuda | |
| 2022/0242155 A1 | 8/2022 | Tajima | |
| 2023/0183509 A1 | 6/2023 | Kusuda | |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, there has been an increasing demand for printed materials, such as packages for food and beverage products, as well as printed materials for commercial use, such as catalogs, pamphlets, and point-of-purchase (POP) advertisements. These printed materials are required to have such bright hues as to attract the attention of customers, and special colors other than the basic colors of cyan, magenta, and yellow are used to expand a color gamut region. In addition, in order to expand the color gamut region, there has been proposed an ink containing a fluorescent coloring material (Japanese Patent Application Laid-Open No. 2000-303008).

In addition, in the commercial printing field and the packaging field, there has been a demand for an increase in speed of printing. In order to satisfy such demand, there is used a recording head which is elongated by arranging a plurality of nozzle arrays so that the plurality of nozzle arrays are displaced from each other in a predetermined direction. In the case of such elongated recording head, a defect called a so-called "streak" may be generated in an image recorded in a discontinuous area at a boundary portion between the adjacent nozzle arrays. In order to suppress the generation of such streak, it is required to arrange the plurality of nozzle arrays in such a manner that parts thereof overlap each other. For example, in order to achieve high-speed recording, there has been proposed an ink jet recording apparatus having mounted thereon a recording head in which a plurality of nozzle arrays are arranged so as to be displaced from each other (Japanese Patent Application Laid-Open No. 2018-187921). In addition, in recent years, there has been a demand for the use of an aqueous ink from the viewpoint of, for example, a reduction in environmental burden.

SUMMARY OF THE INVENTION

The present invention is directed to provide an ink jet recording method capable of recording an image, in which image unevenness is less liable to occur, and which has a high fluorescence intensity and is excellent in color developability, even when an aqueous ink containing a fluorescent dye is ejected from an elongated recording head. The present invention is also directed to provide an ink jet recording apparatus to be used in the above-mentioned ink jet recording method.

That is, according to one aspect of the present invention, there is provided an ink jet recording method including recording an image on a recording medium through use of an ink jet recording apparatus, the ink jet recording apparatus including: an aqueous ink containing resin particles each dyed with a fluorescent dye; and a recording head having a plurality of nozzle arrays each formed by arranging a plurality of nozzles each configured to eject the aqueous ink in a predetermined direction, wherein the plurality of nozzle arrays include a first nozzle array and a second nozzle array arranged so as to be displaced from each other in the predetermined direction in such a manner that end nozzles in the nozzle arrays adjacent to each other form an overlapping portion in a direction intersecting the predetermined direction, wherein the aqueous ink is ejected from overlapping nozzles at the overlapping portion while the nozzles are allocated to the first nozzle array and the second nozzle array, and wherein an application time difference of the aqueous ink ejected from the overlapping nozzles is 20 milliseconds or less.

Further features of the present invention will become apparent from the following description of exemplary embodiments with reference to the attached drawings.

DESCRIPTION OF THE EMBODIMENTS

Figure 1:
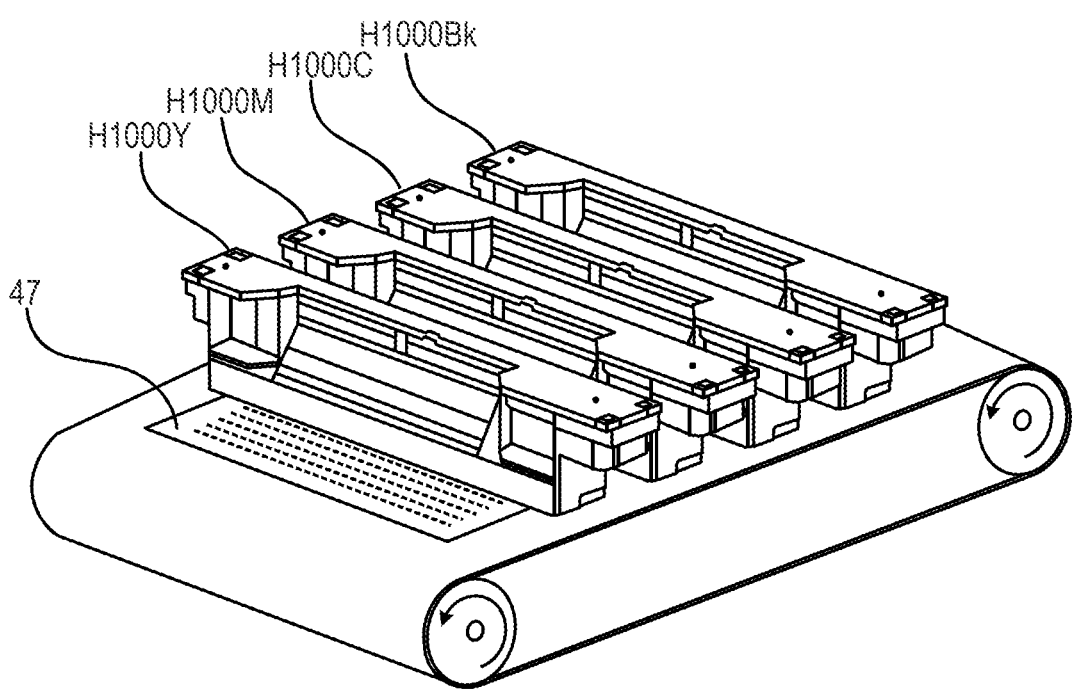
FIG. 1 is an image view in which an image is recorded with a line head.

In order to record an image excellent in color developability at a high speed, the inventors of the present invention have recorded an image by ejecting an aqueous ink containing a fluorescent dye from the recording head of the ink jet recording apparatus proposed in Japanese Patent Application Laid-Open No. 2018-187921 to a recording medium. As a result, it has been found that unevenness is liable to occur in the recorded image. Accordingly, the inventors have made extensive investigations on an ink jet recording method capable of recording an image, in which image unevenness is less liable to occur, and which has a high fluorescence intensity and is excellent in color developability, even when an aqueous ink containing a fluorescent dye is ejected from an elongated recording head, and an ink jet recording apparatus to be used in the above-mentioned ink jet recording method. Thus, the inventors have reached the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink for ink jet is sometimes referred to simply as "ink". Physical property values are values at normal temperature (25° C.), unless otherwise stated.

The inventors have investigated in detail the cause for the occurrence of unevenness in an image recorded by ejecting an ink containing a fluorescent dye from a recording head which is elongated by arranging a plurality of nozzle arrays so that the plurality of nozzle arrays are displaced from each other. As a result, it has been found that the image unevenness is caused by a difference in tint between a part recorded in a so-called "joining portion" in which ends of the nozzle arrays overlap each other and a part recorded in a so-called "non-joining portion" in which ends of the nozzle arrays do not overlap each other. In particular, the part recorded in the joining portion had a fluorescence intensity decreased as compared to that of the part recorded in the non-joining portion. As a result of a further investigation, it has been found that, in an area having the decreased fluorescence intensity in the part recorded in the joining portion, the fluorescent dye is in an aggregated state as compared to an area in which the fluorescence intensity is not decreased. In addition, it has also been found that the image unevenness is a phenomenon, which does not occur in the case of using an aqueous ink that does not contain the fluorescent dye but contains a coloring material other than the fluorescent dye, and which occurs uniquely in the case of using an aqueous ink that contains the fluorescent dye as a coloring material.

In general, in the joining portion of the nozzle arrays, a plurality of nozzle arrays are arranged in parallel so as to form an overlapping portion in a direction intersecting the arrangement direction of the nozzles so that no streaks are generated in a discontinuous area between the nozzle arrays. In addition, overlapping nozzles present at a position corresponding to the joining portion of the nozzle arrays are usually controlled to record an image as described below. The overlapping nozzles present at the position corresponding to the joining portion are present in both of the adjacent nozzle arrays. Thus, the ink is controlled to be dividedly ejected from both the adjacent nozzle arrays, to thereby make the displacement of applied positions of ink dots between the nozzle arrays inconspicuous.

The ink to be ejected from the overlapping nozzles includes an ink allocated to preceding nozzles (hereinafter sometimes referred to as "preceding ink") and an ink allocated to succeeding nozzles (hereinafter sometimes referred to as "succeeding ink"). Thus, the succeeding ink is applied within a short period of time after the preceding ink adheres to a recording medium. The inventors have focused on the adhesion time difference between the preceding ink and the succeeding ink and have made further investigations. As a result, it has been found that, when the succeeding ink is applied within 20 milliseconds after the preceding ink adheres to the recording medium, the image unevenness is liable to occur significantly. The inventors have inferred the reason for the foregoing as described below.

Until 20 milliseconds elapse after the preceding ink adheres to the recording medium, there is kept a state in which, while the concentration of the fluorescent dye is increased through permeation, evaporation of volatile components, and the like, the flowability of the ink is maintained to some degree. Here, when the succeeding ink containing the fluorescent dye at a relatively low concentration is applied, a concentration gradient is formed between the preceding ink and the succeeding ink, and convection occurs between the preceding ink and the succeeding ink. As a result, the fluorescent dye moves between the preceding ink and the succeeding ink, and molecules of the fluorescent dye partially come together to form an aggregate. The fluorescent dye has a feature in that, when an intermolecular distance reaches a certain level or less, the fluorescence intensity is decreased (concentration quenching) for the reason that photoexcited molecules and unexcited molecules interact with each other, resulting in energy transfer, and the like. Thus, it is conceived that the fluorescence intensity of the image recorded in the joining portion of the nozzle arrays is decreased to cause the image unevenness.

When 20 milliseconds elapse after the preceding ink is applied to the recording medium, the flowability of the preceding ink is reduced. It is conceived that, even when the succeeding ink is brought into contact with the preceding ink having reduced flowability, the fluorescent dye is difficult to move, and hence the image unevenness is less liable to occur. The application time difference between the preceding ink and the succeeding ink can be increased by lengthening the distance between the nozzle arrays or slowing the scanning speed of the recording head. However, when the distance between the nozzle arrays is lengthened, the recording head tends to be increased in size. In addition, when the speed of relative scanning between the recording head and the recording medium is slowed, the productivity tends to be decreased.

Under the above-mentioned findings, the inventors have investigated constituent materials for the ink in order to suppress the occurrence of the image unevenness caused by the aggregation of the fluorescent dye on the recording medium. As a result, it has been found that, through use of resin particles each dyed with the fluorescent dye as a coloring material, the aggregation of the fluorescent dye is suppressed, and the occurrence of the image unevenness is suppressed, even in the case of using a recording head which is elongated by arranging a plurality of nozzle arrays so that the plurality of nozzle arrays are displaced from each other in a predetermined direction. Thus, the inventors have reached the present invention. The inventors have inferred the reason why such effect is obtained as described below.

In the case where the resin particles each dyed with the fluorescent dye are used as a fluorescent coloring material, even when convection occurs between the preceding ink and the succeeding ink, the movement of the fluorescent coloring material formed into particles is suppressed as compared to the fluorescent dye not formed into particles. Further, even when the fluorescent coloring material moves, the aggregation of the fluorescent dye is suppressed though the resin particles are aggregated. As a result, molecules of the fluorescent dye with which the resin particles are dyed are present on the recording medium under a state of keeping a certain distance from each other. Thus, it is conceived that the concentration quenching caused by the aggregation can be suppressed, and the occurrence of the image unevenness can be suppressed.

<Ink Jet Recording Apparatus and Ink Jet Recording Method>

In the ink jet recording method of the present invention, there is used an ink jet recording apparatus including an aqueous ink and a recording head having a plurality of nozzle arrays each formed by arranging a plurality of nozzles for ejecting the aqueous ink in a predetermined direction. The aqueous ink contains resin particles each dyed with a fluorescent dye. The ink jet recording method of the present invention includes a step of recording an image on a recording medium through use of the ink jet recording apparatus (hereinafter sometimes referred to as "recording step"). The plurality of nozzle arrays include a first nozzle array and a second nozzle array arranged so as to be displaced from each other in the predetermined direction (arrangement direction of the nozzles) in such a manner that end nozzles in the nozzle arrays adjacent to each other form an overlapping portion in a direction intersecting the predetermined direction. In the recording step, the aqueous ink is ejected from overlapping nozzles at the overlapping portion while the nozzles are allocated to the first nozzle array the second nozzle array. Moreover, an application time difference of the aqueous ink ejected from the overlapping nozzles is 20 milliseconds or less.

In addition, the ink jet recording apparatus of the present invention is an apparatus to be suitably used in the above-mentioned ink jet recording method, and includes an aqueous ink and a recording head. In the ink jet recording apparatus of the present invention, the plurality of nozzle arrays include a first nozzle array and a second nozzle array arranged so as to be displaced from each other in the predetermined direction (arrangement direction of the nozzles) in such a manner that end nozzles in the nozzle arrays adjacent to each other form an overlapping portion in a direction intersecting the predetermined direction. Moreover, the aqueous ink is ejected from overlapping nozzles at the overlapping portion while the nozzles are allocated to the first nozzle array and the second nozzle array, and an application time difference of the aqueous ink ejected from the overlapping nozzles is 20 milliseconds or less.

As described above, the aqueous ink is ejected from overlapping nozzles at the overlapping portion while the nozzles are allocated to the first nozzle array and the second nozzle array, and the application time difference of the aqueous ink ejected from the overlapping nozzles is 20 milliseconds or less. In addition, the application time difference is preferably 1 millisecond or more, more preferably 5 milliseconds or more.

As a recording head of an ink jet system, there may be given a serial head that records an image by conveying a recording medium in a sub-scanning direction while reciprocating in a main scanning direction and a line head that records an image by conveying a recording medium without moving itself. The recording head is preferably (i) a line head or (ii) a serial head that records an image by applying an ink to a unit region of a recording medium through one relative scanning with respect to the recording medium (single-pass recording). The case in which an image is recorded with the line head or the serial head that performs the single-pass recording is compared to the case in which an image is recorded with a serial head that records an image by applying an ink to a unit region of a recording medium through a plurality of times of relative scanning with respect to the recording medium (multi-pass recording). In the case of the former, the image unevenness in the joining portion tends to be slightly conspicuous as compared to the case of the latter, with the result that a suppressing effect on the image unevenness can be more significantly obtained and the image can be recorded at a higher speed. In the case of the multi-pass recording, the amount of an ink to be applied at a time is reduced as compared to the single-pass recording, and hence the image unevenness is less liable to occur. However, it takes time for recording, and hence the productivity tends to be slightly decreased.

The ejection amount per droplet of the ink is preferably 40.0 ng or less, more preferably 10.0 ng or less. When the ejection amount per droplet of the ink is set to the above-mentioned ranges, the fixing of the ink on the recording medium can be accelerated. Thus, the fixing of the preceding ink in the joining portion is accelerated, and the movement of the coloring material when the succeeding ink adheres to the recording medium can be more efficiently suppressed, with the result that the suppressing effect on the image unevenness can be further improved. The ejection amount per droplet of the ink is preferably 1.0 ng or more.

The recording head preferably includes a temperature control mechanism for warming the ink. When the warmed ink is applied to the recording medium, the permeation and evaporation of the preceding ink can be accelerated, and the movement of the fluorescent coloring material when the succeeding ink adheres to the recording medium can be suppressed, with the result that the suppressing effect on the image unevenness can be further improved. Examples of the temperature control mechanism may include a heater (sub-heater) for ink temperature adjustment installed on the recording head and a heater for ink ejection. The arrangement area of the sub-heater is not particularly limited. The sub-heater may be arranged on the periphery of the nozzle array, or one or more sub-heaters may be arranged so as to correspond to the nozzles forming the nozzle array. In order to control the temperature of the ink (heat or warm the ink) with the heater for ink ejection, for example, it is only required to repeatedly energize the heater with an electric current to such a degree as not to cause the ink to be ejected. The temperature of the ink may be controlled through use of the sub-heater and the heater for ink ejection in combination. When the sub-heater and the heater for ink ejection are used in combination, the sub-heater and the heater for ink ejection may be used appropriately so that the temperature of the ink is raised to a certain temperature with one heater, and is then kept in the vicinity of a desired temperature with the other heater. The temperature of the ink may be read, for example, with a temperature sensor provided on the recording head. It is preferred that the temperature of the ink be set to a temperature higher than that of a recording environment. The temperature of the ink is set to preferably 25° C. or more to 80° C. or less, more preferably 40° C. or more to 60° C. or less.

Examples of the ink ejection system may include a system including applying mechanical energy to the ink and a system including applying thermal energy to the ink. Of those, an ink ejection system including applying thermal energy to the ink is preferably adopted. Besides the foregoing, each step of the ink jet recording method may be set to the same as that of a known ink jet recording method.

Figure 2:
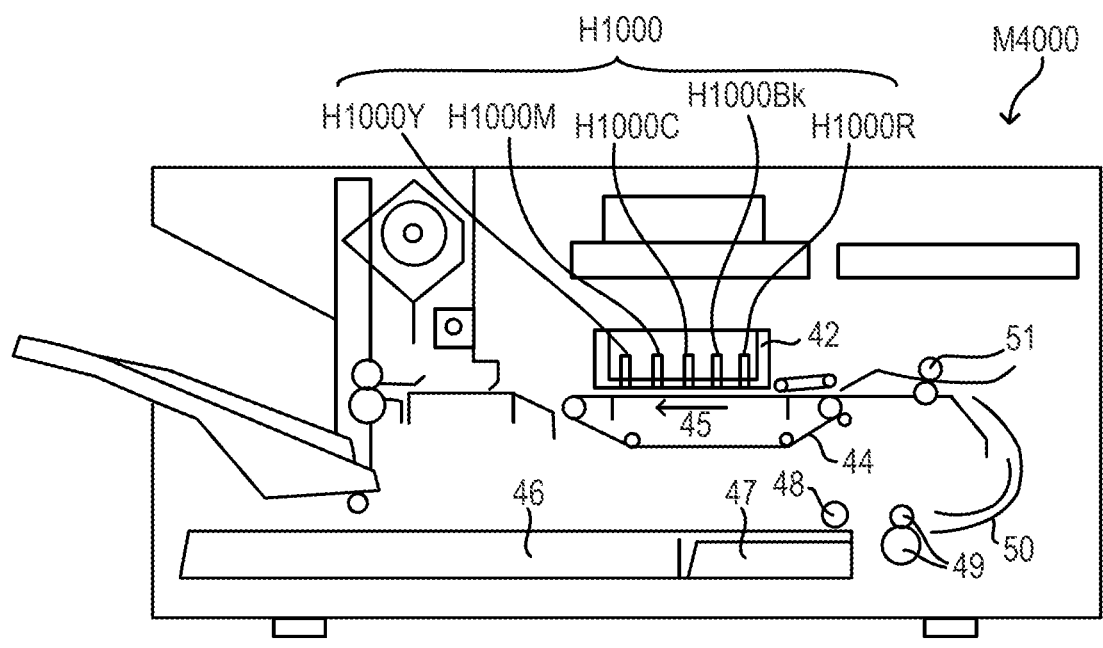
FIG. 2 is a schematic view for illustrating an example of an ink jet recording apparatus.

FIG. 1 is an image view in which an image is recorded with a line head. In addition, FIG. 2 is a schematic view for illustrating an example of the ink jet recording apparatus. In a recording apparatus M4000 illustrated in FIG. 2, a line head (recording head H1000) is fixed to a main body of the recording apparatus, and a system of recording an image by conveying a recording medium 47 in a direction indicated by the arrow 45 is adopted. The recording apparatus M4000 includes, for example, a recording head H1000Y for yellow ink, a recording head H1000M for magenta ink, a recording head H1000C for cyan ink, and a recording head H1000Bk for black ink (FIG. 1). Ink colors are not limited to the foregoing, and an aqueous ink described later may be used as an ink of at least one color.

The recording heads H1000Y to H1000R illustrated in FIG. 2 are fixed by a recording head holder 42 placed on the recording apparatus M4000. In each of FIG. 1 and FIG. 2, there is illustrated a configuration in which inks of respective colors of yellow, magenta, cyan, and black and further a reaction liquid are ejected from separate recording heads. Needless to say, there may be adopted a configuration in which an image is recorded by ejecting a plurality of inks and further a reaction liquid respectively from a plurality of nozzle arrays provided on one recording element substrate.

A sheet feeding cassette 46 accommodates the recording media 47 therein and is removably mounted on the main body of the recording apparatus. A pickup roller 48 is a member that feeds out the uppermost sheet of the recording media 47 accommodated inside the sheet feeding cassette 46. Conveying rollers 49 are each a member that conveys the recording medium 47 fed out by the pickup roller 48 to a conveyance path 50. In addition, conveying rollers 51 arranged on an outlet side of the conveyance path 50 are each a member that conveys the recording medium 47 in a direction of the recording head H1000 under a state in which the recording medium 47 is placed on a conveying belt 44.

Figure 3A:
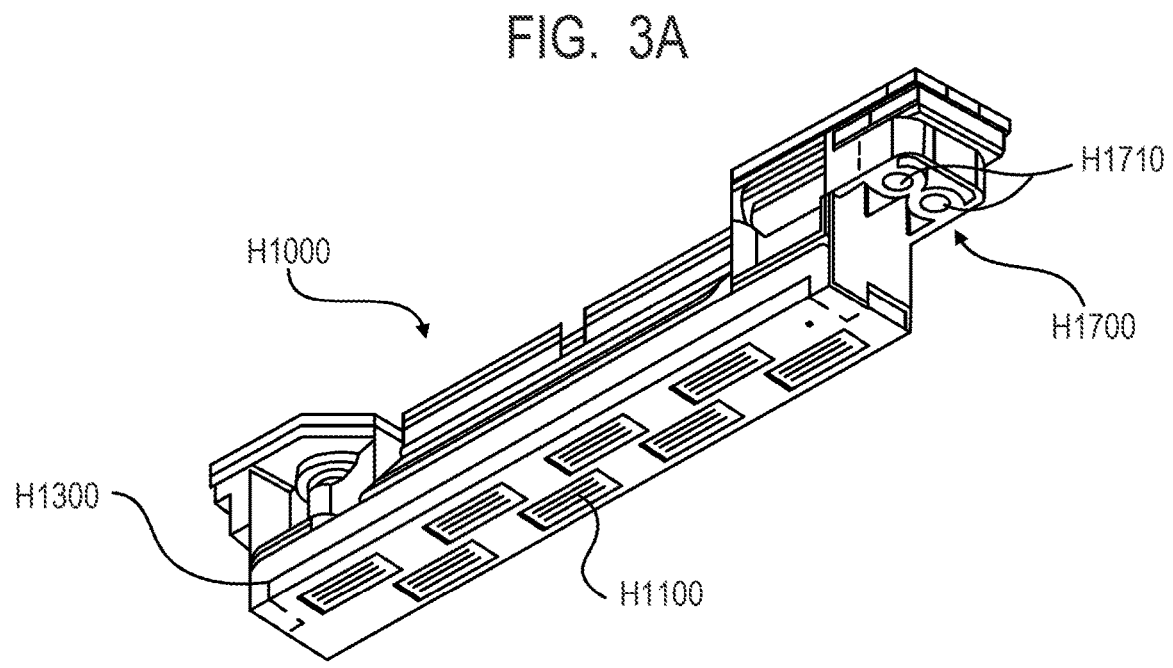
FIG. 3A is a perspective view for schematically illustrating an example of the line head.
Figure 3B:
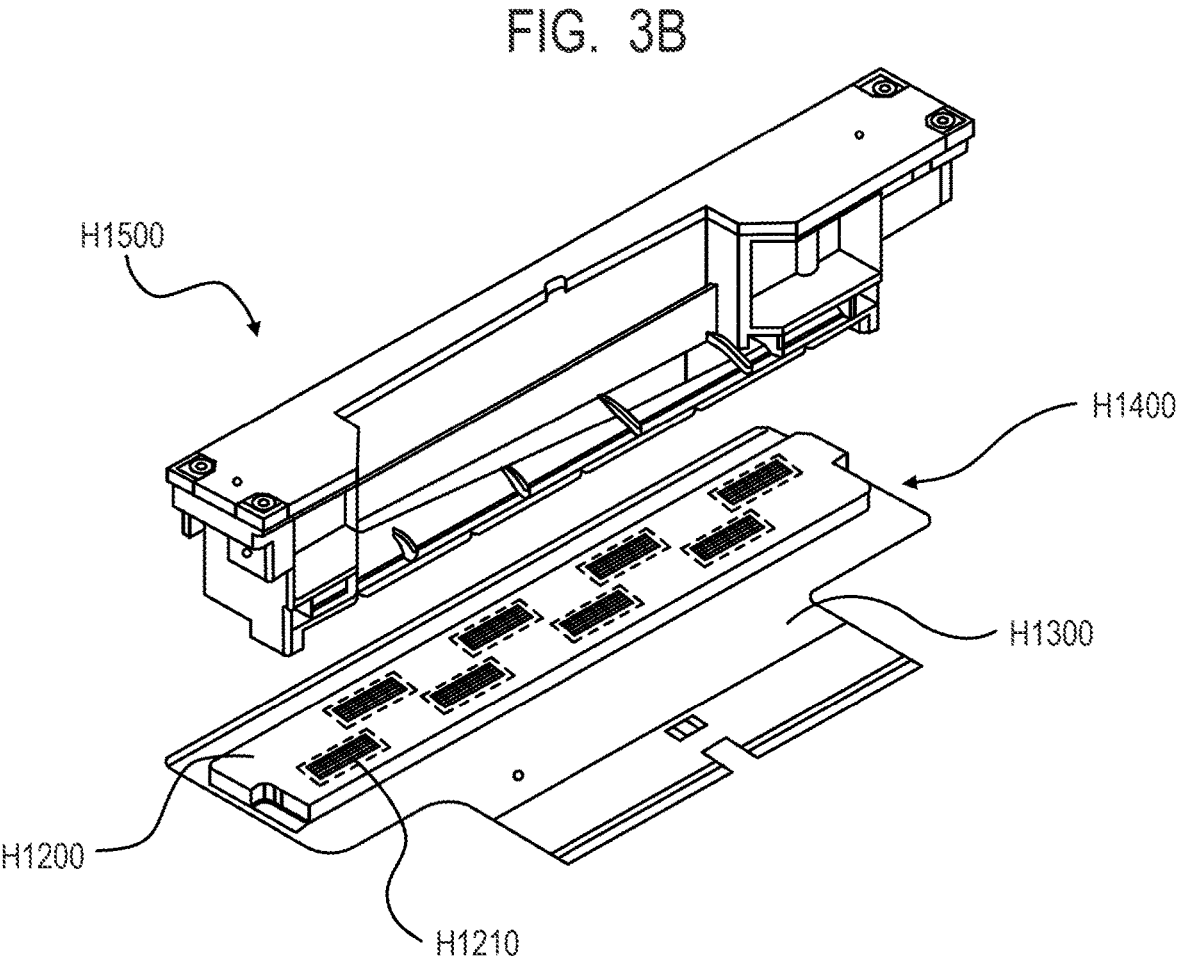
FIG. 3B is an exploded perspective view for schematically illustrating the example of the line head.

FIG. 3A and FIG. 3B are each a view for schematically illustrating an example of the line head. FIG. 3A is a perspective view, and FIG. 3B is an exploded perspective view. As illustrated in FIG. 3A and FIG. 3B, the line head (recording head H1000) includes a recording element unit H1400 and an ink supply unit H1500 that is a liquid supply unit for supplying an ink to the recording element unit H1400. The ink supply unit H1500 includes a connecting portion H1700 having formed therein connecting ports H1710 connected to an outside, such as the recording apparatus, so as to supply the ink from the outside to an ink chamber (not shown). In addition, the recording element unit H1400 includes recording element substrates H1100, a support substrate H1200, and a wiring member H1300.

The support substrate H1200 is a member that holds and fixes the recording element substrates H1100 and the wiring member H1300, and has formed therein ink supply holes H1210 that supply the ink supplied from the ink supply unit H1500 to the recording element substrates H1100. A plurality of recording element substrates H1100 are arranged and fixed on a main surface of the support substrate H1200 with predetermined positional accuracy. In addition, the plurality of recording element substrates H1100 are arranged on the support substrate H1200 in a staggered shape so that the nozzles are continuously arranged along the direction of the nozzle arrays between the adjacent recording element substrates H1100. Thus, the recording element substrates H1100 are arranged in such a manner that the nozzles in the joining portion of the adjacent recording element substrates H1100 overlap each other, to thereby enable the influence on an image by positional displacement or the like of the recording element substrates to be corrected, with the result that a recording head of a full-line type having an elongated recording width is achieved.

The wiring member H1300 is electrically connected to the recording element substrates H1100 in order to transmit an electric signal and electric power for driving recording elements provided on the recording element substrates H1100 from the outside of the recording head H1000 (recording apparatus) to the recording element substrates H1100. A printed wiring board having flexibility, such as a flexible wiring board, is used as the wiring member H1300. In addition, the wiring member H1300 having flexibility is bent so that the electrical connection between the recording element substrates H1100 and the recording apparatus is easily performed, and is fixed to the ink supply unit H1500.

Figure 6:
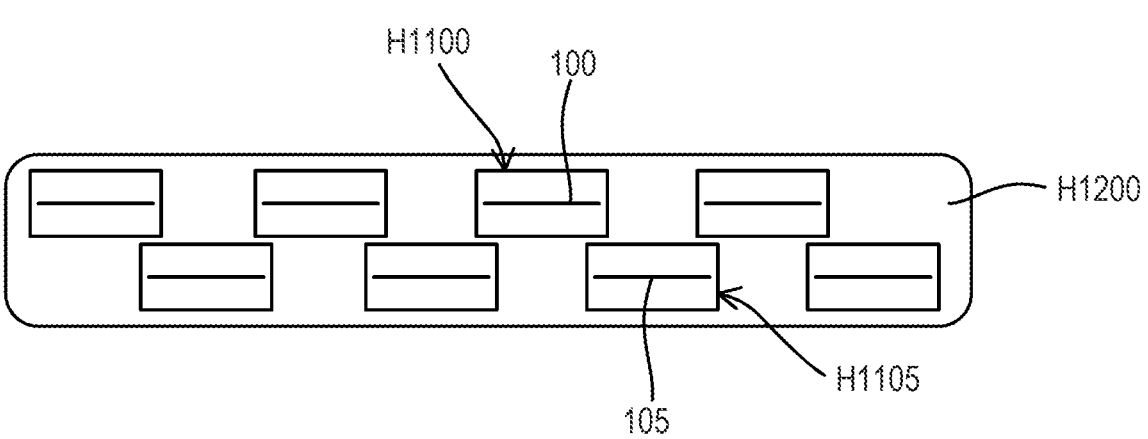
FIG. 6 is a schematic view for illustrating an example of an arrangement mode of nozzle arrays in the line head.

FIG. 6 is a schematic view for illustrating an example of an arrangement mode of nozzle arrays in the line head. As illustrated in FIG. 6, the line head that is an example of the recording head forming the ink jet recording apparatus of the present invention includes recording element substrates H1100 and H1105. The recording element substrate H1100 has a first nozzle array 100 formed by arranging a plurality of nozzles for ejecting an ink in a predetermined direction. The recording element substrate H1105 has a second nozzle array 105 formed by arranging a plurality of nozzles for ejecting an ink in a predetermined direction. The first nozzle array 100 and the second nozzle array 105 adjacent to each other are arranged so as to be displaced from each other in the predetermined direction (arrangement direction of the nozzles) in such a manner that end nozzles form an overlapping portion in a direction intersecting the predetermined direction. A plurality of recording element substrates including the recording element substrate H1100 having the first nozzle array 100 and the recording element substrate H1105 having the second nozzle array 105 are all held on the support substrate H1200. At the overlapping portion, the aqueous ink is dividedly ejected from both overlapping nozzles forming part of the overlapping portion in the first nozzle array and overlapping nozzles forming part of the overlapping portion in the second nozzle array.

Figure 7:
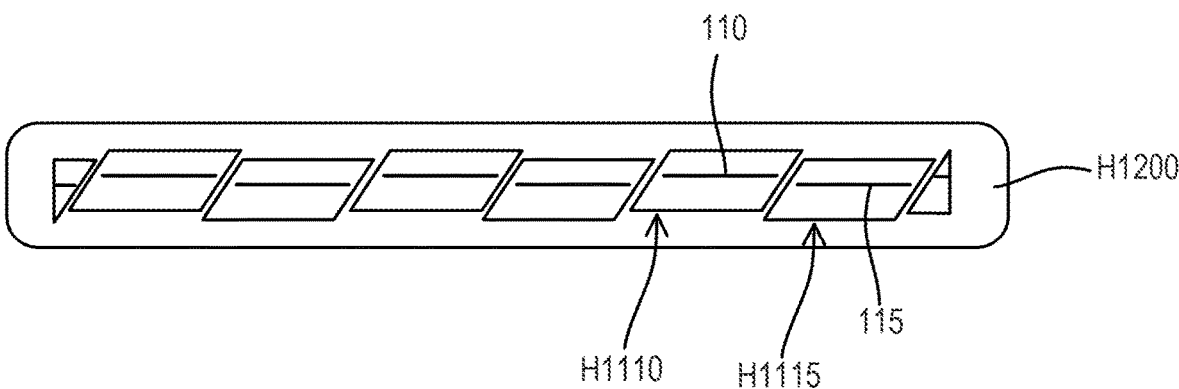
FIG. 7 is a schematic view for illustrating another example of the arrangement mode of nozzle arrays in the line head.

The arrangement mode of the recording element substrates is not particularly limited. An example of the arrangement mode of the recording element substrates may be an arrangement mode in a staggered shape as illustrated in FIG. 6. Further, as illustrated in FIG. 7, a plurality of recording element substrates including a recording element substrate H1110 having a first nozzle array 110 and a recording element substrate H1115 having a second nozzle array 115 may be arranged in an in-line shape.

Figure 4A:
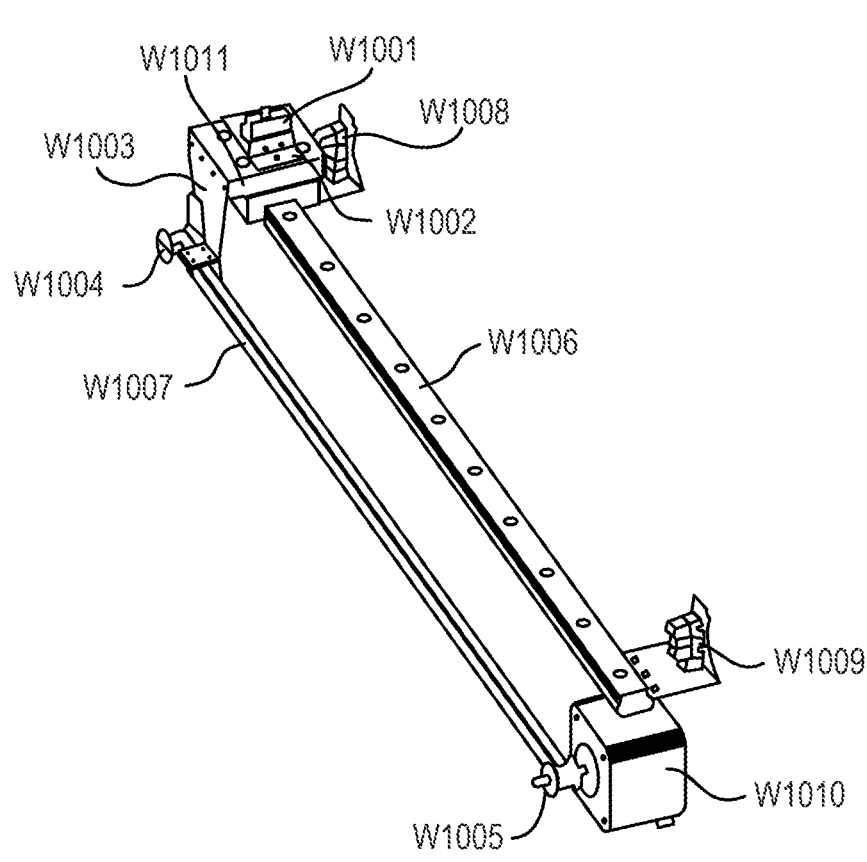
FIG. 4A is a perspective view for illustrating an example of a recovery mechanism.
Figure 4B:
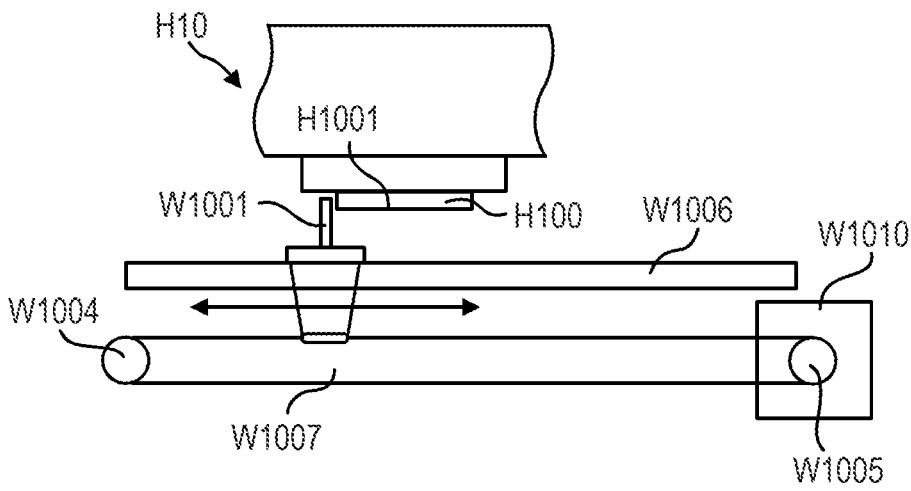
FIG. 4B is a schematic view for illustrating the example of the recovery mechanism.

The ink jet recording apparatus to be used in the ink jet recording method of the present invention may further include a recovery mechanism that recovers the state of sticking of an ink at an ejection orifice of the line head and wetting of an ejection orifice surface. FIG. 4A and FIG. 4B are each a view for illustrating an example of the recovery mechanism. FIG. 4A is a perspective view, and FIG. 4B is a schematic view. As illustrated in FIG. 4A and FIG. 4B, a wiper W1001 is held by a clip member W1002, and the clip member W1002 is held by a coupling member W1003. In addition, the clip member W1002 is mounted on a wipe base W1011 capable of moving on a slide rail W1006. The wipe base W1011 can move on the slide rail W1006 by the drive of a timing belt W1007 through the coupling member W1003. The timing belt W1007 is supported by a driven pulley W1004 and a drive pulley W1005, and a shaft of a drive motor W1010 that drives the timing belt W1007 is coupled to the drive pulley W1005. In addition, in order to control the position of the wiper W1001 during a recovery operation, photosensors W1008 and W1009 are provided at both end portions of the slide rail W1006. During the recovery operation by wiping, the wiper W1001 slides to move along the slide rail W1006, to thereby wipe an ejection orifice surface H1001 of a recording head H100 while warping.

Figure 5:
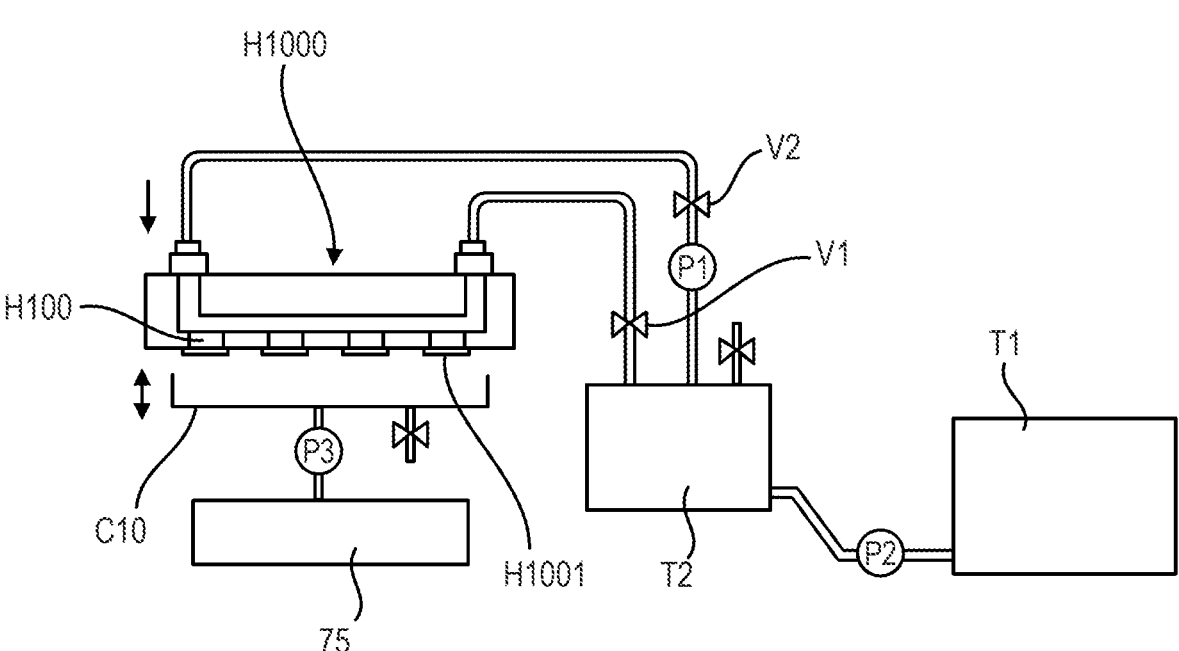
FIG. 5 is a schematic view for illustrating an example of a supply mechanism that supplies an ink to the line head.

The ink jet recording apparatus to be used in the ink jet recording method of the present invention may further include a supply mechanism that supplies a liquid, such as an ink, to the line head. FIG. 5 is a schematic view for illustrating an example of the supply mechanism that supplies an ink to the line head. As illustrated in FIG. 5, an ink is supplied from a sub-tank T2 to the line head H1000 with a pump P1. The ink overflowing from the line head H1000 is returned to the sub-tank T2. A valve V1 is provided in order to switch an ink liquid chamber inside the line head between pressurization and release of a pressure during the recovery operation. During pressure recovery, the valve V1 is closed to pressurize the ink liquid chamber with the pump P1, to thereby remove part of bubbles inside an ink supply path and an ink flow path. The ink liquid surface inside the sub-tank T2 is formed so that a difference in hydraulic head from the ejection orifice surface of the line head H1000 is kept within a certain range, and a negative pressure of the ejection orifice surface of the line head H1000 is maintained within an appropriate range. When the ink inside the sub-tank T2 becomes insufficient, an ink is sent from a main tank T1 to the sub-tank T2 with a pump P2. The temperatures of each of the tanks and the ink stored therein depend on the environmental temperature in which the ink jet recording apparatus is placed, but fall within a range of preferably from 15° C. to 45° C.

Any medium may be used as the recording medium on which an image is to be recorded by the ink jet recording method of the present invention. Of such media, such sheets of paper each having permeability as described below are preferably used: a recording medium free of any coating layer, such as plain paper or uncoated paper; and a recording medium including a coating layer, such as glossy paper or art paper. In particular, the recording medium including a coating layer, such as glossy paper or art paper, is preferably used.

Ink

In the ink jet recording method of the present invention, an ink containing resin particles each dyed with a fluorescent dye is used. Each component for forming an ink to be used in the ink jet recording method of the present invention and the like are described in detail below.

Resin Particles Each Dyed with Fluorescent Dye

The ink contains resin particles each dyed with a fluorescent dye (fluorescent particles). Through use of the fluorescent particles in which the fluorescent dye is immobilized on the resin particles, color development efficiency can be improved, and the characteristics, such as water resistance, of an image to be recorded can be improved.

The term "resin particles each dyed with a fluorescent dye (fluorescent particles)" as used herein refers to particles that emit fluorescence by excitation light beams in an ultraviolet or visible region. Whether or not particles correspond to the "fluorescent particles" that exhibit fluorescence can be determined in accordance with, for example, the method described below. A sample obtained by dispersing particles in a liquid that can disperse the particles is irradiated with ultraviolet rays (ultraviolet light) having a long wavelength (from about 315 nm to about 400 nm) to a slightly visible degree by a black light or the like. When light having a color different from that of the ultraviolet light radiated from the black light can be visually observed, the particles can be determined to be the "fluorescent particles" that exhibit fluorescence. A commercially available product (e.g., product name "SLUV-4" (manufactured by AS ONE Corporation)) may be used as the black light.

The term "resin particles" as used herein means a resin that is dispersed in an aqueous medium and may be present in the aqueous medium in a state having a particle diameter. Thus, the resin particles are present in a state of being dispersed in the ink, that is, in a state of a resin emulsion.

Whether or not a resin corresponds to the "resin particles" can be determined in accordance with the method described below. First, a liquid (resin solid content: 10% by mass) containing a resin neutralized with an alkali (sodium hydroxide, potassium hydroxide, etc.) equivalent to an acid value is prepared. Next, the prepared liquid is diluted 10-fold (based on a volume) with pure water to prepare a sample solution. Then, when the particle diameter of the resin in the sample solution is measured by a dynamic light scattering method, and particles each having a particle diameter are measured, the resin can be determined to be the "resin particles". As a particle size distribution-measuring apparatus using the dynamic light scattering method, a particle size analyzer (e.g., product name "UPA-EX 150", manufactured by Nikkiso Co., Ltd.) or the like may be used. The measurement conditions in this case may be set to, for example, SetZero: 30 seconds, number of measurements: 3, measurement time: 180 seconds, shape: spherical shape, and refractive index: 1.59. Needless to say, the particle size distribution-measuring apparatus, the measurement conditions, and the like to be used are not limited to the foregoing. The purpose of measuring the particle diameter through use of the neutralized resin is to recognize that particles are formed even when the resin is sufficiently neutralized to make it more difficult to form particles. The resin having a shape of a particle even under such conditions is present in a state of a particle even in an aqueous ink.

The fluorescent dye in the resin particles each dyed with the fluorescent dye may be analyzed in accordance with, for example, the procedure described below. Resin particles taken out from an ink in accordance with an ordinary method are dissolved in an organic solvent, such as chloroform, to prepare a sample. A fluorescent dye is isolated from the prepared sample through use of a high-performance liquid chromatograph (HPLC). The isolated dye is analyzed by a general structure analysis method, such as nuclear magnetic resonance (NMR) spectroscopy or matrix-assisted laser desorption/ionization mass spectrometry (MALDI-MS).

As the fluorescent dye, a basic dye, an acid dye, a disperse dye, an oil-soluble dye, or the like may be used. Of those, a basic dye is preferred. Examples of the skeleton of the dye may include xanthene, azine, azole, thiazole, azo, diaryl methane, triaryl methane, acridine, coumarin, and methine skeletons. Of those, compounds having, for example, xanthene and coumarin skeletons are preferred, and a compound having a xanthene skeleton is more preferred.

The basic dye is a compound exhibiting fluorescence, which has an amino group or an imino group (that may form a salt) in a molecular structure thereof. Examples of the compound having an amino group or an imino group in the molecular structure thereof may include "dyes each including 'basic' in the name shown in the Colour Index International". The Colour Index International is a database of coloring materials constructed by the Society of Dyers and Colourists (SDC) and others.

When specific examples of the basic dye exhibiting fluorescence are each represented by a C.I. number or a general name, examples thereof may include: C.I. Basic Red 1, 1:1, 2, 4, 8, 11, 12, and 13; C.I. Basic Violet 1, 3, 10, 11, 11:1, and 14; rhodamine 19 and 575; C.I. Basic Yellow 1, 2, 9, 13, 24, 37, 40, and 96; C.I. Basic Blue 7; C.I. Basic Green 1; and C.I. Fluorescent Brightener 363. Of those, for example: C.I. Basic Red 1 and 1:1; C.I. Basic Violet 11 and 11:1; and C.I. Basic Yellow 40 are preferred because the dyes each have excellent color developability.

The acid dye is a compound exhibiting fluorescence, which has an acid group (that may form a salt), such as a carboxylic acid group or a sulfonic acid group, in a molecular structure thereof. Examples of the compound having an acid group in the molecular structure thereof may include "dyes each including 'acid' in the name shown in the Colour Index International". When specific examples of the acid dye exhibiting fluorescence are each represented by a C.I.

number, examples thereof may include C.I. Acid Blue 9, C.I. Acid Yellow 7, C.I. Acid Yellow 23, C.I. Acid Red 52, C.I. Acid Red 87, C.I. Acid Red 92, and C.I. Acid Black 2.

The disperse dye is a compound exhibiting fluorescence, which has low water solubility or is not dissolved in water. Examples of the "disperse dye" may include "dyes each including 'disperse' in the name shown in the Colour Index International". Examples of the skeleton of the dye may include azo, coumarin, and anthraquinone skeletons. Of those, compounds having, for example, coumarin and anthraquinone skeletons are preferred, and a compound having a coumarin skeleton is more preferred.

When specific examples of the disperse dye exhibiting fluorescence are each represented by a C.I. number, examples thereof may include: C.I. Disperse Yellow 82 and 186; C.I. Disperse Red 58 and 60; and C.I. Disperse Orange 11. Of those, for example, C.I. Disperse Yellow 82 is preferred because the dye has excellent color developability.

The oil-soluble dye is a compound exhibiting fluorescence, which has low water solubility or is not dissolved in water. Examples of the oil-soluble dye may include "dyes each including 'solvent' in the name shown in the Colour Index International". Examples of the skeleton of the dye may include coumarin, xanthene, azo, aminoketone, anthraquinone skeletons. Of those, compounds having, for example, coumarin and xanthene skeletons are preferred, and a compound having a coumarin skeleton is more preferred.

When specific examples of the oil-soluble dye exhibiting fluorescence are each represented by a C.I. number, examples thereof may include: C.I. Solvent Yellow 7, 43, 44, 85, 98, 131, 160:1, 172, and 196; C.I. Solvent Red 43, 44, 45, 49, and 149; and C.I. Solvent Orange 5, 45, 63, and 115. Of those, for example, C.I. Solvent Yellow 160:1 and 196 are preferred because the dyes each have excellent color developability.

The content (% by mass) of the fluorescent dye in the ink is preferably 0.1% by mass or more to 5.0% by mass or less with respect to the total mass of the ink. The ratio (% by mass) of the fluorescent dye in the resin particles is preferably 1.0% by mass or more to 15.0% by mass or less, more preferably 2.0% by mass or more to 8.0% by mass or less. When the ratio of the fluorescent dye in the resin particles is too small, the color developability (chroma) of an image may be slightly decreased. Meanwhile, when the ratio of the fluorescent dye in the resin particles is too large, the color developability (lightness) of an image may be slightly decreased due to concentration quenching.

As the resin particles for forming the "resin particles each dyed with a fluorescent dye", resin particles each having a so-called core-shell structure including a core portion and a shell portion covering the core portion are preferably used. The core portion preferably has an aromatic group-containing unit and a cyano group-containing unit. In addition, the shell portion preferably has an aromatic group-containing unit and an anionic group-containing unit, and may further have a unit derived from a cross-linking agent or the like.

As a monomer that forms an aromatic group-containing unit through polymerization, a monomer having one polymerizable functional group such as an ethylenically unsaturated bond in a molecule thereof is preferred. Of those, styrene and derivatives thereof are preferred from the viewpoints of satisfactory reactivity during polymerization and excellent stability of resin particles to be obtained, and styrene and vinyl toluene are particularly preferred.

As a monomer that forms a cyano group-containing unit through polymerization, a monomer having one polymerizable functional group such as an ethylenically unsaturated bond in a molecule thereof is preferred. Of those, acrylonitrile and methacrylonitrile are particularly preferred from the viewpoints of satisfactory reactivity during polymerization and excellent stability of resin particles to be obtained.

As an anionic group in the anionic group-containing unit, an anionic group having one polymerizable functional group such as an ethylenically unsaturated bond in a molecule thereof is preferred. Specific examples thereof may include a carboxylic acid group, a phenolic hydroxy group, and a phosphoric acid ester group. Of those, a carboxylic acid group is preferred because the stability of the resin particles in the ink is satisfactory. The anionic group may be in any of an acid form and a salt form. When the anionic group is in a salt form, the anionic group may be in any of a partially dissociated state or an entirely dissociated state. When the anionic group is in a salt form, as a cation serving as a counter ion, there may be given, for example, an alkali metal cation, ammonium, and organic ammonium.

The core portion and the shell portion of the resin particle may each have a unit other than those described above as long as the effect of the present invention is not impaired. As the unit other than those described above, a unit having one polymerizable functional group in the molecule is preferred, and a specific example thereof may be a unit derived from an ethylenically unsaturated monomer.

It is preferred that a temperature-control temperature Th of the recording head and a glass transition temperature Tg of the resin particles satisfy a relationship: Th<Tg. When the glass transition temperature Tg of the resin particles is set to be higher than the temperature-control temperature Th of the recording head (temperature of the ink warmed by the temperature control mechanism), the fluorescent dye is less liable to leak out from the fluorescent particles in the ink adhering to the recording medium, and the suppressing effect on the image unevenness can be further improved. The glass transition temperature Tg of the resin particles is a value measured for dried resin particles as a sample for measurement with a differential scanning calorimeter.

The content (% by mass) of the resin particles in the ink is preferably 1.0% by mass or more to 10.0% by mass or less with respect to the total mass of the ink. When the content of the resin particles is less than 1.0% by mass, the color developability of an image may be slightly decreased. Meanwhile, when the content of the resin particles is more than 10.0% by mass, the ejection stability of the ink may be slightly decreased.

Production Method for Dyed Resin Particles

Resin particles may be produced in accordance with a conventionally known method, such as an emulsion polymerization method, a mini-emulsion polymerization method, a seed polymerization method, or a phase inversion emulsification method. As a method of dyeing resin particles, there may be given, for example, a method involving polymerizing a monomer mixed liquid having a fluorescent dye dissolved therein to form resin particles, and a method involving adding a fluorescent dye to resin particles, followed by heating. Of those, a method involving adding a fluorescent dye to resin particles, followed by heating, is preferred because the method can be applied to a wider variety of fluorescent dyes. It is preferred that no dyeing aid (a water-soluble resin, a surfactant, etc.) be added during heating. When a water-soluble resin is used as the dyeing aid, the water-soluble resin may form a film to inhibit the redispersion of resin particles, which may slightly decrease the sticking recoverability of the ink. In addition, when a surfactant is used as the dyeing aid, the physical properties of the ink may be influenced, and the ejection stability of the ink may be slightly decreased.

Method of Verifying Resin Particles

The configuration of resin particles may be verified in accordance with the method described in the following sections (i) to (iii). A method of analyzing and verifying resin particles by extracting the resin particles from an ink is described below, but the resin particles extracted from an aqueous dispersion liquid or the like may also be analyzed and verified in the same manner.

(i) Extraction of Resin Particles

Resin particles may be separated and extracted from an ink containing the resin particles by a density gradient centrifugation method. The resin particles are separated and extracted based on a difference in sedimentation coefficient of components in a density gradient sedimentation velocity method out of the density gradient centrifugation methods. In addition, the resin particles are separated and extracted based on a difference in density of components in a density gradient sedimentation equilibrium method out of the density gradient centrifugation methods.

(ii) Recognition and Separation of Layer Structure

First, the resin particles are each dyed and immobilized with ruthenium tetroxide, and then embedded in an epoxy resin to be stably held. Then, the resin particle embedded in the epoxy resin is cut with an ultramicrotome, and a cross-section is observed with a scanning transmission electron microscope (STEM). The layer structure of the resin particle can be recognized by observing the cross-section cut along the gravity center of the resin particle. The resin particle embedded in the epoxy resin is used as an analysis sample, and elements contained in a layer (a core portion or a shell portion) forming the resin particle can be quantitatively analyzed by STEM-EDX in which energy dispersive X-ray spectroscopy (EDX) is also provided.

(iii) Analysis of Unit (Monomer) for forming Resin in each Layer

The resin particles to be used as a sample for separating a resin in each layer may be in a state of a dispersion liquid. In addition, resin particles in a state of being dried and formed into a film may also be used as a sample. Resin particles to be used as a sample are dissolved in an organic solvent. After that, each layer is separated by gel permeation chromatography (GPC), and the resin for forming each layer is fractionated. Then, the fractionated resin is subjected to elemental analysis by a combustion method. Separately from the foregoing, the fractionated resin is subjected to pretreatment by an acid decomposition (hydrofluoric acid addition) method or an alkali fusion method, and then an inorganic component is quantitatively analyzed by inductively coupled plasma emission spectroscopy. The layer of the resin particles formed of the fractionated resin can be known by comparison of the results of the elemental analysis and the quantitative analysis of the inorganic component to the results of the quantitative analysis of the elements by STEM-EDX obtained in the section (ii).

In addition, the fractionated resin is analyzed by nuclear magnetic resonance (NMR) spectroscopy and matrix-assisted laser desorption/ionization mass spectrometry (MALDI-MS). Thus, the kinds and ratios of the unit (monomer) and the cross-linking component for forming the resin can be known. Further, the monomer generated by depolymerization can also be directly detected by analyzing the fractionated resin by pyrolysis gas chromatography.

Water-Soluble Resin

The ink preferably contains a water-soluble resin having an anionic group (the "water-soluble resin having an anionic group" is hereinafter sometimes simply referred to as "water-soluble resin"). In addition, the water-soluble resin is preferably at least one of an acrylic resin and a urethane resin. The water-soluble resin is easily present between the fluorescent particles without any gap. Accordingly, the use of the ink containing the water-soluble resin together with the fluorescent particles can improve the color developability of an image to be recorded. The water-soluble resin is preferably a urethane resin. A urethane bond in the urethane resin has a high hydrogen bonding property. Accordingly, the use of the ink containing the water-soluble urethane resin having an anionic group facilitates the formation of a uniform image improved in surface energy, and hence can further improve the color developability of the image. The content (% by mass) of the water-soluble resin in the ink is preferably 1.00% by mass or more to 8.00% by mass or less with respect to the total mass of the ink The acid value of the water-soluble resin is preferably 100 mgKOH/g or less, more preferably 80 mgKOH/g or less. When the acid value of the water-soluble resin is more than 100 mgKOH/g, the hydrophilicity of the water-soluble resin becomes so high that the adsorption power thereof on the aggregate of the resin particles may reduce to reduce a color developability-improving effect. The acid value of the water-soluble resin is preferably 30 mgKOH/g or more.

Acrylic Resin

The acrylic resin is a resin having a unit derived from a monomer having a (meth)acrylic structure, such as (meth) acrylic acid or a (meth)acrylate. Examples of the form of the acrylic resin may include a block copolymer, a random copolymer, a graft copolymer, and a combination thereof. The acrylic resin preferably has a hydrophilic unit and a hydrophobic unit. Of such resins, a resin having a hydrophilic unit derived from (meth)acrylic acid, and a hydrophobic unit derived from at least one monomer selected from styrene and α-methylstyrene is preferred. The use of such acrylic resin facilitates the occurrence of an interaction with the resin particles, and hence can further improve the color developability.

The hydrophilic unit is a unit having a hydrophilic group such as an anionic group. The hydrophilic unit may be formed by polymerizing a hydrophilic monomer having a hydrophilic group. Examples of the hydrophilic monomer having a hydrophilic group may include: acidic monomers each having a carboxylic acid group, such as (meth)acrylic acid, itaconic acid, maleic acid, and fumaric acid; and anionic monomers, such as anhydrides and salts of these acidic monomers. Cations for forming the salts of the acidic monomers may be, for example, ions of lithium, sodium, potassium, ammonium, and an organic ammonium.

The hydrophobic unit is a unit free of a hydrophilic group such as an anionic group. The hydrophobic unit may be formed by polymerizing a hydrophobic monomer free of a hydrophilic group such as an anionic group. Examples of the hydrophobic monomer may include: monomers each having an aromatic ring, such as styrene, α-methylstyrene, and benzyl (meth)acrylate; and (meth)acrylic acid ester-based monomers, such as methyl (meth)acrylate, butyl (meth) acrylate, and 2-ethylhexyl (meth)acrylate.

Urethane Resin

The urethane resin is a resin having: a unit derived from a polyisocyanate; and units derived from polyols including an anionic group-containing polyol having an anionic group such as an acid group. The urethane resin is synthesized by using, for example, a polyisocyanate and a polyol. A polyamine, a cross-linking agent, a chain extender, and the like may each be used as required at the time of the synthesis.

The polyisocyanate is a compound having two or more isocyanate groups in a molecule thereof. The content (mol %) of the unit derived from the polyisocyanate in the urethane resin is preferably 10 mol % or more to 60 mol % or less. Examples of the polyisocyanate may include an aliphatic polyisocyanate and an aromatic polyisocyanate.

Examples of the aliphatic polyisocyanate may include: polyisocyanates each having a chain structure, such as tetramethylene diisocyanate, hexamethylene diisocyanate, and dodecamethylene diisocyanate; and polyisocyanates each having a cyclic structure, such as isophorone diisocyanate, hydrogenated xylylene diisocyanate, and 4,4'-dicyclohexylmethane diisocyanate. Examples of the aromatic polyisocyanate may include tolylene diisocyanate, 2,2'-diphenylmethane diisocyanate, and 2,4'-diphenylmethane diisocyanate. The polyisocyanate is preferably an aliphatic polyisocyanate, more preferably at least one of isophorone diisocyanate or hexamethylene diisocyanate.

The polyols are each a compound having two or more hydroxy groups in a molecule thereof. The content (mol %) of the units derived from the polyols in the urethane resin is preferably 40 mol % or more to 90 mol % or less. Examples of the polyols may include: a polyol free of an acid group, such as a polyether polyol, a polyester polyol, or a polycarbonate polyol; and a polyol having an acid group, such as a carboxylic acid group, a sulfonic acid group, a phosphoric acid group, or a phosphonic acid group.

The polyol free of an acid group is preferably a polyester polyol. The urethane resin having a unit derived from the polyester polyol has an ester bond in a molecule thereof. Accordingly, the ink containing the urethane resin having the unit derived from the polyester polyol does not carry an excessively large amount of water at the time of its impact on a recording medium, and hence the urethane resin hardly sinks in an ink-receiving layer for forming the recording medium. Thus, the urethane resin efficiently remains in an image with ease, and hence the color developability of the image can be further improved.

In addition, the polyol free of an acid group is preferably a polyether polyol. Examples of the polyether polyol may include: addition polymers of an alkylene oxide and polyols; and glycols such as a (poly)alkylene glycol. Examples of the alkylene oxide may include ethylene oxide, propylene oxide, and butylene oxide. Examples of the polyols that undergo addition polymerization with the alkylene oxide may include 1,3-propanediol, 1,3-butanediol, and 1,4-butanediol. Examples of the glycols may include: (poly)alkylene glycols, such as polyethylene glycol, propylene glycol, and polypropylene glycol; and an ethylene glycol-propylene glycol copolymer. The ratio (mol %) of the polyol free of an acid group in all the polyols is preferably 50 mol % or more to 80 mol % or less.

The polyol having an acid group is preferably a polyol having a carboxylic acid group. Examples of the polyol having a carboxylic acid group may include dimethylolacetic acid, dimethylolpropionic acid, and dimethylolbutanoic acid. Of those, dimethylolpropionic acid is preferred as the polyol having an acid group. The acid group of the polyol having an acid group may be in a salt form. A cation for forming the salt may be, for example, an ion of an alkali metal, such as lithium, sodium, or potassium, an ammonium ion, or a cation of an organic amine such as dimethylamine. The molecular weight of a general-purpose polyol having an acid group is typically about 400 or less. A unit derived from the polyol having an acid group typically serves as the hard segment of the urethane resin. The ratio (mol %) of the polyol having an acid group in all the polyols is preferably 20 mol % or more to 50 mol % or less.

When the water-soluble resin is the urethane resin, the content (% by mass) of the urethane resin in the ink is preferably 0.04 times or more to 1.00 times or less in terms of mass ratio with respect to the content (% by mass) of the resin particles (fluorescent particles) each dyed with the fluorescent dye. When the above-mentioned mass ratio is less than 0.04 times, a color developability-improving effect may reduce. Meanwhile, when the above-mentioned mass ratio is more than 1.00 times, the amount of the urethane resin liberated in the ink becomes somewhat large. Accordingly, the urethane resin in the ink that has exuded to the periphery of an ejection orifice may be liable to adhere thereto to reduce the ejection stability of the ink.

Aqueous Medium

The ink is an aqueous ink containing at least water as an aqueous medium. The ink may further contain a water-soluble organic solvent as the aqueous medium. As the water, deionized water or ion-exchanged water is preferably used. The content (% by mass) of the water in the ink is preferably 50.0% by mass or more to 95.0% by mass or less with respect to the total mass of the ink. In addition, as the water-soluble organic solvent, any water-soluble organic solvent generally used for an ink may be used. Examples thereof include alcohols, (poly)alkylene glycols, glycol ethers, nitrogen-containing compounds, and sulfur-containing compounds. The content (% by mass) of the water-soluble organic solvent in the ink is preferably 3.0% by mass or more to 50.0% by mass or less with respect to the total mass of the ink.

Surfactant

It is preferred that the ink further contain a silicone-based surfactant. When the ink containing a silicone-based surfactant is used, the silicone-based surfactant in the preceding ink adhering to the recording medium is quickly oriented to the surfaces of ink dots. After that, even when the succeeding ink applied to the recording medium adheres to the ink dots, the movement of the fluorescent coloring material between the ink dots is suppressed, and hence the suppressing effect on the image unevenness can be further improved.

The content (% by mass) of the silicone-based surfactant in the ink is preferably 0.1% by mass or more to 3.0% by mass or less with respect to the total mass of the ink. When the content of the silicone-based surfactant is less than 0.1% by mass, the amount of the silicone-based surfactant to be oriented to the surfaces of the ink dots is small, and the suppressing effect on the image unevenness may be slightly reduced. Meanwhile, when the content of the silicone-based surfactant is more than 3.0% by mass, the amount of the silicone-based surfactant present on the surfaces of the ink dots may become excessive, with the result that an improving effect on the color developability of an image may be slightly reduced. The HLB value of the silicone-based surfactant is preferably 8 or more to 16 or less.

It is preferred that the ink further contain a surfactant other than the above-mentioned silicone-based surfactant (other surfactant). Examples of the other surfactant may include an anionic surfactant, a nonionic surfactant, a cationic surfactant, an amphoteric surfactant, and a fluorine-based surfactant. Of those, a nonionic surfactant, such as an ethylene oxide adduct of acetylene glycol or polyoxyethylene alkyl ether, is preferred. The content (% by mass) of the other surfactant in the ink is preferably 0.1% by mass or more to 2.0% by mass or less with respect to the total mass of the ink.

Other Additives

In addition to the above-mentioned components, as required, the ink may also contain water-soluble organic compounds that are solids at room temperature, for example, polyhydric alcohols, such as trimethylolpropane and trimethylolethane, urea and urea derivatives such as ethylene urea. Further, as required, the ink may contain various additives, such as a pH adjuster, a rust preventive, a preservative, a fungicide, an antioxidant, a reduction inhibitor, an evaporation accelerator, a chelating agent, and any other resin.

Physical Properties of Ink

The dynamic surface tension of the ink at a lifetime of 10 msec measured by a maximum bubble pressure method is preferably 40 mN/m or less. When the dynamic surface tension of the ink falls within the above-mentioned range, dots easily spread on a recording medium, and hence the image unevenness due to the aggregation of the fluorescent dye can be further suppressed. The dynamic surface tension of the ink can be easily controlled by appropriately selecting the amounts and kinds of a water-soluble organic solvent having high permeability and the surfactant. Although the lower limit value of the dynamic surface tension of the ink at a lifetime of 10 msec is not particularly limited, for example, the dynamic surface tension is preferably 30 mN/m or more, more preferably 35 mN/m or more.

The maximum bubble pressure method is a method including measuring the maximum pressure required for the release of air bubbles produced at the tip of a probe (capillary) immersed in a liquid to be subjected to measurement, and determining the surface tension of the liquid from the maximum pressure, and the maximum pressure is measured while the air bubbles are continuously produced at the tip of the probe. At this time, a time period from the time point when the surface of a new air bubble is produced at the tip of the probe to the time point when the maximum pressure is obtained (time point when the radius of curvature of each of the air bubbles and the radius of the tip portion of the probe are equal to each other) is referred to as "lifetime". The dynamic surface tension of the ink is a value measured at 25° C.

The pH of the ink at 25° C. is preferably 5.0 or more to 10.0 or less, more preferably 7.0 or more to 9.5 or less. The static surface tension of the ink at 25° C. is preferably 30 mN/m or more to 45 mN/m or less, more preferably 35 mN/m or more to 40 mN/m or less. The viscosity of the ink at 25° C. is preferably 1.0 mPa·s or more to 5.0 mPa·s or less.

According to one aspect of the present invention, there can be provided an ink jet recording method capable of recording an image, in which image unevenness is less liable to occur, and which has a high fluorescence intensity and is excellent in color developability, even when an aqueous ink containing a fluorescent dye is ejected from an elongated recording head. In addition, according to another aspect of the present invention, there can be provided an ink jet recording apparatus to be used in the above-mentioned ink jet recording method.

EXAMPLES

The present invention is described in more detail below by way of Examples and Comparative Examples. However, the present invention is by no means limited to Examples below without departing from the gist of the present invention. "Part(s)" and "%" with regard to the description of the amounts of components are by mass, unless otherwise stated.

Preparation of Aqueous Dispersion Liquid of Resin Particles

Measurement of Glass Transition Temperature of Resin Particles

Dyed resin particles (fluorescent resin particles) and 1 mol/L hydrochloric acid were mixed at a ratio of 1:1 (based on a mass), and the generated precipitate was collected. The precipitate was washed with water three times and dried in an oven for 24 hours to provide a dried product. A THF solution prepared by dissolving the resultant dried product in tetrahydrofuran (THF) was filtered through a filter of 0.2 μm formed of polytetrafluoroethylene. The collected filtrate was dried at room temperature for 24 hours. The resultant dried product was collected, and the glass transition temperature thereof was measured with a differential scanning calorimeter (product name "DSC 2500", manufactured by TA Instruments Japan Inc.). The measured glass transition temperature of the resin particles is shown in Table 1.

Aqueous Dispersion Liquids of Resin Particles 1 to 3 and 6 to 9

A reaction vessel having a stirring device mounted thereon was set in a hot water bath. 1,178 Parts of water was placed in the reaction vessel, and the internal temperature was held at 70° C. 100.0 Parts of styrene, 100.0 parts of acrylonitrile, and 18.0 parts of a reactive surfactant (product name "ADEKA REASOAP SR-10", manufactured by Adeka Corporation) were mixed to prepare a monomer mixed liquid for a core portion. In addition, 1.9 parts of potassium persulfate and 659 parts of water were mixed to prepare an aqueous solution 1 of a polymerization initiator. The monomer mixed liquid for a core portion and the aqueous solution 1 of a polymerization initiator were dropped in parallel into the reaction vessel over 60 minutes. After the completion of dropping, stirring was continued to further perform the reaction for 30 minutes, to thereby synthesize particles each serving as a core portion of resin particles.

Then, 20.0 parts of styrene, 20.0 parts of methacrylic acid, 20.0 parts of ethylene glycol diglycidyl ether, and 0.8 part of a reactive surfactant were mixed to prepare a monomer mixed liquid for a shell portion. EX-810 (product name "DENACOL EX-810", manufactured by Nagase ChemteX Corporation) was used as ethylene glycol diglycidyl ether. The reactive surfactant is the same kind as that used for synthesis of the core portion. In addition, 0.1 part of potassium persulfate and 133 parts of water were mixed to prepare an aqueous solution 2 of a polymerization initiator. The monomer mixed liquid for a shell portion and the aqueous solution 2 of a polymerization initiator were dropped in parallel into the reaction vessel containing the particles each serving as a core portion over 10 minutes. After the completion of dropping, stirring was performed to continue the reaction at 80° C. for 10 minutes, to thereby synthesize a shell portion. Thus, resin particles each having a core-shell structure in which the particles each serving as a core portion were covered with the resin serving as a shell portion were synthesized.

An 8 mol/L potassium hydroxide aqueous solution was added to the reaction vessel to adjust the pH to 8.5, and then, a fluorescent dye (powder) of each of the kinds shown in Table 1 was added to the reaction vessel. The amount of the added fluorescent dye was set to an amount corresponding to a "ratio (%) in resin particles" shown in Table 1. After the temperature was raised to 80° C., an 8 mol/L potassium hydroxide aqueous solution was added to the reaction vessel to adjust the pH of the liquid to 8.5. After that, the resultant was stirred for 2 hours to dye the resin particles with the fluorescent dye. After the pH of the liquid was adjusted to 8.5 by adding an 8 mol/L potassium hydroxide aqueous solution, an appropriate amount of water was further added to provide an aqueous dispersion liquid of the resin particles of each of the kinds in which the content of the resin particles was 20.0%.

Aqueous Dispersion Liquid of Resin Particles 4

A reaction vessel having a stirring device mounted thereon was set in a hot water bath. 1,178 Parts of water was placed in the reaction vessel, and the internal temperature was held at 70° C. 75.0 Parts of styrene, 20.0 parts of n-butyl acrylate, 10.0 parts of acrylic acid, and 2.5 parts of sodium dodecyl sulfate were mixed to prepare a monomer mixed liquid. In addition, 0.1 part of potassium persulfate and 133 parts of water were mixed to prepare an aqueous solution 3 of a polymerization initiator. The monomer mixed liquid and the aqueous solution 3 of a polymerization initiator were dropped in parallel into the reaction vessel over 10 minutes. After the completion of dropping, stirring was continued to further perform the reaction at 80° C. for 5 hours, to thereby synthesize particles.

An appropriate amount of an 8 mol/L potassium hydroxide aqueous solution was added to the reaction vessel to adjust the pH of the liquid to 8.5. Further, a fluorescent dye (powder) of the kind shown in Table 1 was added to the reaction vessel. The amount of the added fluorescent dye was set to an amount corresponding to a "ratio (%) in resin particles" shown in Table 1. After that, the resultant was stirred for 2 hours to dye the resin particles with the fluorescent dye. After the pH of the liquid was adjusted to 8.5 by adding an 8 mol/L potassium hydroxide aqueous solution, an appropriate amount of water was further added to provide an aqueous dispersion liquid of resin particles 4 in which the content of the resin particles was 20.0%.

Aqueous Dispersion Liquids of Resin Particles 5 and 10

A reaction vessel having a stirring device mounted thereon was set in a hot water bath. 1,178 Parts of water was placed in the reaction vessel, and the internal temperature was held at 70° C. 45.0 Parts of styrene, 45.0 parts of n-butyl acrylate, 15.0 parts of acrylic acid, and 2.5 parts of sodium dodecyl sulfate were mixed to prepare a monomer mixed liquid. In addition, 0.1 part of potassium persulfate and 133 parts of water were mixed to prepare an aqueous solution 4 of a polymerization initiator. The monomer mixed liquid and the aqueous solution 4 of a polymerization initiator were dropped in parallel into the reaction vessel over 10 minutes. After the completion of dropping, stirring was continued to further perform the reaction at 80° C. for 5 hours, to thereby synthesize particles.

An appropriate amount of an 8 mol/L potassium hydroxide aqueous solution was added to the reaction vessel to adjust the pH of the liquid to 8.5. Further, a fluorescent dye (powder) of each of the kinds shown in Table 1 was added to the reaction vessel. The amount of the added fluorescent dye was set to an amount corresponding to a "ratio (%) in resin particles" shown in Table 1. After that, the resultant was stirred for 2 hours to dye the resin particles with the fluorescent dye. After the pH of the liquid was adjusted to 8.5 by adding an 8 mol/L potassium hydroxide aqueous solution, an appropriate amount of water was further added to provide an aqueous dispersion liquid of the resin particles of each of the kinds in which the content of the resin particles was 20.0%.

TABLE 1

| | Synthesis conditions and characteristics of resin particles | | | |
|---|---|---|---|---|
| | Fluorescent dye | | | Glass transition |
| Resin particles | Kind | Ratio (%) in resin particles | Structure | temperature (° C.) |
| 1 | C.I. Basic Red 1 | 5.0 | Core-shell | 100 |
| 2 | C.I. Basic Red 1 + C.I. Basic Violet 11 (mass ratio = 4:1) | 5.0 | Core-shell | 100 |
| 3 | C.I. Solvent Yellow 160 | 5.0 | Core-shell | 100 |
| 4 | C.I. Basic Red 1 | 5.0 | Single layer | 60 |
| 5 | C.I. Basic Red 1 | 5.0 | Single layer | 20 |
| 6 | C.I. Basic Red 1 | 1.0 | Core-shell | 100 |
| 7 | C.I. Basic Red 1 | 2.0 | Core-shell | 100 |
| 8 | C.I. Basic Red 1 | 8.0 | Core-shell | 100 |
| 9 | C.I. Basic Red 1 | 9.0 | Core-shell | 100 |
| 10 | C.I. Basic Red 1 | 9.0 | Single layer | 20 |

Preparation of Aqueous Solution of Fluorescent Dye 1.0 Part of C.I. Basic Red 1 and 1.0 part of C.I. Basic Violet 11 were dissolved in 98.0 parts of ion-exchanged water at 80° C. to prepare an aqueous solution of fluorescent dyes in which the content of the fluorescent dyes was 2.0%.

Preparation of Pigment Dispersion Liquid

Pigment Dispersion Liquid 1

Parts of a pigment, 20.0 parts of an aqueous solution of a resin dispersant (content of a resin (solid content): 20.0%), and 70.0 parts of ion-exchanged water were mixed to provide a mixture. As the pigment, C.I. Pigment Red 122 was used. In addition, as the aqueous solution of the resin dispersant, an aqueous solution obtained by dissolving a styrene-acrylic acid copolymer (weight-average molecular weight: 10,000, acid value: 200 mgKOH/g) that was a water-soluble resin in ion-exchanged water through use of sodium hydroxide that was equimolar to the acid value of the resin was used. The resultant mixture was dispersed for 3 hours through use of a batch-type vertical sand mill and then filtered under pressure through a microfilter (manufactured by FUJIFILM Corporation) having a pore size of 1.2 μm. Then, the content of the pigment was adjusted by adding ion-exchange water to provide a pigment dispersion liquid 1. The pigment dispersion liquid 1 contained the pigment dispersed by the water-soluble resin (resin dispersant). The content of the pigment was 10.0%, and the content of the water-soluble resin was 4.0%.

Pigment Dispersion Liquid 2

A pigment dispersion liquid 2 was obtained in the same manner as in the above-mentioned case of the pigment dispersion liquid 1 except that the kind of the pigment was changed to C.I. Pigment Yellow 74. The pigment dispersion liquid 2 contained the pigment dispersed by the water-soluble resin (resin dispersant). The content of the pigment was 10.0%, and the content of the water-soluble resin was 4.0%.

Preparation of Liquid Containing Water-Soluble Resin

Poly(3-methylpentylene adipate) glycol (PMPAG) whose amount was shown in Table 2 was dissolved in methyl ethyl ketone. Next, isophorone diisocyanate (IPDI) and dimethylolpropionic acid (DMPA) whose amounts were shown in Table 2 were added to the solution, and the contents were caused to react with each other at 75° C. for 1 hour to provide a urethane prepolymer solution.

After the resultant urethane prepolymer solution had been cooled to 60° C., water containing potassium hydroxide that was equimolar to the acid value of the resin was added to neutralize a carboxylic acid group. The resultant was cooled to 40° C., and ion-exchanged water was added thereto, followed by high-speed stirring with a homomixer to emulsify the mixture. Ethylenediamine (EDA) whose amount was shown in Table 2 was added to the emulsified product, and the mixture was subjected to a chain extension reaction at 30° C. for 12 hours. After the absence of an isocyanate group had been recognized by FT-IR, decompression under heating was performed to evaporate methyl ethyl ketone. Thus, a liquid containing a urethane resin 1 in which the content of the resin was 20.0% was obtained. The weight-average molecular weight of the urethane resin 1 in the resultant liquid was 30,000. In addition, the acid value of the urethane resin was measured by potentiometric titration including using a potassium hydroxide-ethanol titrant. Abbreviations in Table 2 have the following meanings: PMPAG represents poly(3-methylpentylene adipate) glycol (number-average molecular weight: 2,000); IPDI represents isophorone diisocyanate; DMPA represents dimethylolpropionic acid; and EDA represents ethylenediamine.

TABLE 2

| Composition and acid value of urethane resin | | | | | |
|---|---|---|---|---|---|
| Urethane resin | Monomer (unit: part(s)) | | | | Acid value (mgKOH/g) |
| | PMPAG | IPDI | DMPA | EDA | |
| 1 | 41.9 | 46.1 | 12.0 | 2.1 | 50 |

Preparation of Ink

Respective components (unit: %) shown in the upper columns of each of Table 3-1 and Table 3-3 were mixed, stirred sufficiently, and then filtered under pressure through a microfilter (manufactured by FUJIFILM Corporation) having a pore size of 3.0 μm to prepare each ink. In the lower columns of each of Table 3-1 and Table 3-3, ink characteristics are shown. The product names of surfactants used for preparation of each ink are as described below.

BYK348, BYK347, BYK3456, and BYK3420 (product names, manufactured by BYK-Chemie GmbH): nonionic silicone-based surfactants Acetylenol E100 (product name, manufactured by Kawaken Fine Chemicals Co., Ltd.): nonionic hydrocarbon-based surfactant

TABLE 3-1

| Composition and characteristics of ink | | | | | | | | | | | | |
|---|---|---|---|---|---|---|---|---|---|---|---|---|
| | Ink | | | | | | | | | | | |
| | 1 | 2 | 3 | 4 | 5 | 6 | 7 | 8 | 9 | 10 | 11 | 12 |
| Aqueous dispersion liquid of resin particles 1 | 25.0 | 25.0 | 25.0 | | | | | | | | | 25.0 |
| Aqueous dispersion liquid of resin particles 2 | | | | 25.0 | | | | | | | | |
| Aqueous dispersion liquid of resin particles 3 | | | | | 25.0 | | | | | | | |
| Aqueous dispersion liquid of resin particles 4 | | | | | | 25.0 | | | | | | |
| Aqueous dispersion liquid of resin particles 5 | | | | | | | 25.0 | | | | | |
| Aqueous dispersion liquid of resin particles 6 | | | | | | | | 25.0 | | | | |
| Aqueous dispersion liquid of resin particles 7 | | | | | | | | | 25.0 | | | |
| Aqueous dispersion liquid of resin particles 8 | | | | | | | | | | 25.0 | | |
| Aqueous dispersion liquid of resin particles 9 | | | | | | | | | | | 25.0 | |
| Aqueous dispersion liquid of resin particles 10 | | | | | | | | | | | | |
| Aqueous solution of fluorescent dye | | | | | | | | | | | | |
| Pigment dispersion liquid 1 | | | | | | | | | | | | |
| Pigment dispersion liquid 2 | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 |

TABLE 3-1-continued

| Composition and characteristics of ink | | | | | | | | | | | | |
| --- | --- | --- | --- | --- | --- | --- | --- | --- | --- | --- | --- | --- |
| | Ink | | | | | | | | | | | |
| | 1 | 2 | 3 | 4 | 5 | 6 | 7 | 8 | 9 | 10 | 11 | 12 |
| Triethylene glycol | 10.0 | 5.0 | 5.0 | 10.0 | 10.0 | 10.0 | 10.0 | 10.0 | 10.0 | 10.0 | 10.0 | 10.0 |
| 1,2-Butanediol | | 5.0 | | | | | | | | | | |
| Propylene glycol | | | 5.0 | | | | | | | | | |
| BYK348 | 0.5 | 0.5 | 0.5 | 0.5 | 0.5 | 0.5 | 0.5 | 0.5 | 0.5 | 0.5 | 0.5 | |
| BYK347 | | | | | | | | | | | | 0.5 |
| BYK3456 | | | | | | | | | | | | |
| BYK3420 | | | | | | | | | | | | |
| Acetylenol E100 | 0.5 | 0.5 | 0.5 | 0.5 | 0.5 | 0.5 | 0.5 | 0.5 | 0.5 | 0.5 | 0.5 | 0.5 |
| Liquid containing water-soluble resin | | | | | | | | | | | | |
| Ion-exchanged water | 54.0 | 54.0 | 54.0 | 54.0 | 54.0 | 54.0 | 54.0 | 54.0 | 54.0 | 54.0 | 54.0 | 54.0 |
| Content (%) of silicone-based surfactant | 0.5 | 0.5 | 0.5 | 0.5 | 0.5 | 0.5 | 0.5 | 0.5 | 0.5 | 0.5 | 0.5 | 0.5 |

TABLE 3-2

| Composition and characteristics of ink | | | | | | | | | | | |
| --- | --- | --- | --- | --- | --- | --- | --- | --- | --- | --- | --- |
| | Ink | | | | | | | | | | |
| | 13 | 14 | 15 | 16 | 17 | 18 | 19 | 20 | 21 | 22 | 23 |
| Aqueous dispersion liquid of resin particles 1 | 25.0 | 25.0 | 25.0 | 25.0 | 25.0 | 25.0 | 25.0 | | | | |
| Aqueous dispersion liquid of resin particles 2 | | | | | | | | | | | |
| Aqueous dispersion liquid of resin particles 3 | | | | | | | | | | | |
| Aqueous dispersion liquid of resin particles 4 | | | | | | | | | | | |
| Aqueous dispersion liquid of resin particles 5 | | | | | | | | | | | |
| Aqueous dispersion liquid of resin particles 6 | | | | | | | | | | | |
| Aqueous dispersion liquid of resin particles 7 | | | | | | | | | | | |
| Aqueous dispersion liquid of resin particles 8 | | | | | | | | | | | |
| Aqueous dispersion liquid of resin particles 9 | | | | | | | | | | | |
| Aqueous dispersion liquid of resin particles 10 | | | | | | | | 25.0 | | | |
| Aqueous solution of fluorescent dye | | | | | | | | | 25.0 | | |
| Pigment dispersion liquid 1 | | | | | | | | | | 25.0 | |
| Pigment dispersion liquid 2 | | | | | | | | | | | 25.0 |
| Glycerin | 10.0 | 10.0 | 10.0 | 10.0 | 10.0 | 10.0 | 10.0 | 10.0 | 10.0 | 10.0 | 10.0 |
| Triethylene glycol | 10.0 | 10.0 | 10.0 | 10.0 | 10.0 | 10.0 | 10.0 | 10.0 | 10.0 | 10.0 | 10.0 |
| 1,2-Butanediol | | | | | | | | | | | |
| Propylene glycol | | | | | | | | | | | |
| BYK348 | | | 0.05 | 0.10 | 3.0 | 4.0 | | | 0.5 | 0.5 | 0.5 |
| BYK347 | | | | | | | | | | | |
| BYK3456 | 0.5 | | | | | | | | | | |
| BYK3420 | | 0.5 | | | | | | | | | |
| Acetylenol E100 | 0.5 | 0.5 | 0.5 | 0.5 | 0.5 | 0.5 | 0.5 | 0.5 | 0.5 | 0.5 | 0.5 |
| Liquid containing water-soluble resin | | | | | | | | | | | |
| Ion-exchanged water | 54.0 | 54.0 | 54.5 | 54.4 | 51.5 | 50.5 | 54.5 | 54.5 | 54.0 | 54.0 | 54.0 |
| Content (%) of silicone-based surfactant | 0.5 | 0.5 | 0.05 | 0.10 | 3.0 | 4.0 | 0.0 | 0.0 | 0.5 | 0.5 | 0.5 |

TABLE 3-3

| Composition and characteristics of ink | | |
| --- | --- | --- |
| | Ink | |
| | 24 | 25 |
| Aqueous dispersion liquid of resin particles 1 | 25.0 | 25.0 |
| Aqueous dispersion liquid of resin particles 2 | | |
| Aqueous dispersion liquid of resin particles 3 | | |
| Aqueous dispersion liquid of resin particles 4 | | |
| Aqueous dispersion liquid of resin particles 5 | | |
| Aqueous dispersion liquid of resin particles 6 | | |
| Aqueous dispersion liquid of resin particles 7 | | |
| Aqueous dispersion liquid of resin particles 8 | | |
| Aqueous dispersion liquid of resin particles 9 | | |
| Aqueous dispersion liquid of resin particles 10 | | |
| Aqueous solution of fluorescent dye | | |
| Pigment dispersion liquid 1 | | |
| Pigment dispersion liquid 2 | | |
| Glycerin | 10.0 | 10.0 |
| Triethylene glycol | 10.0 | 10.0 |
| 1,2-Butanediol | | |
| Propylene glycol | | |
| BYK348 | 0.5 | 0.5 |
| BYK347 | | |
| BYK3456 | | |
| BYK3420 | | |
| Acetylenol E100 | 0.5 | 0.5 |
| Liquid containing water-soluble resin | 1.0 | 25.0 |
| Ion-exchanged water | 53.0 | 29.0 |
| Content (%) of silicone-based surfactant | 0.5 | 0.5 |

Configuration of Recording Head

Recording heads 1 to 10 of a thermal ink jet system that ejects an ink by applying thermal energy were prepared. Each of the recording heads 1 to 10 includes a sub-heater for temperature control. The number of nozzles per nozzle array is 512, a nozzle density per nozzle array is 600 dpi, an ejection amount per ink droplet is 4 ng, and the number of nozzle arrays for each ink color is 2.

Recording Head 1

Figure 9:
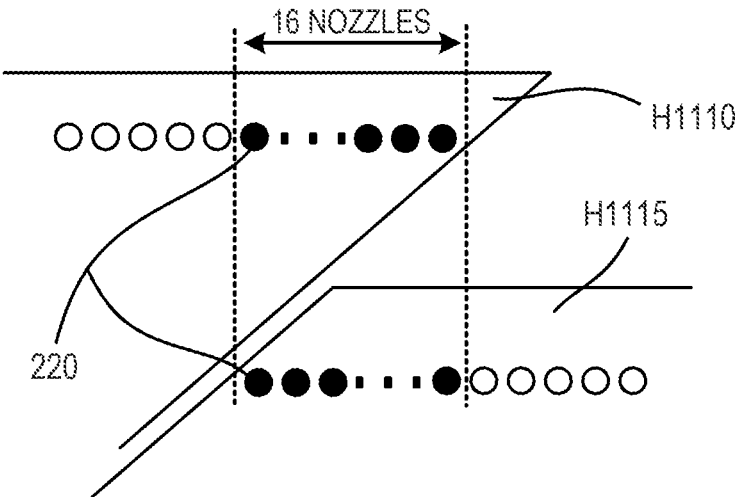
FIG. 9 is a schematic view for illustrating an arrangement mode of nozzles in nozzle arrays forming a recording head 1.

The recording head 1 is a line head in which a plurality of recording element substrates H1110 and H1115 are arranged in an in-line shape as illustrated in FIG. 7. As illustrated in FIG. 9, the number of overlapping nozzles 220 per nozzle array is 16, and an ink ejection amount per nozzle is 5.0 ng/dot. In addition, the distance between the nozzle arrays is 0.1 inch.

Recording Head 2

Figure 8:
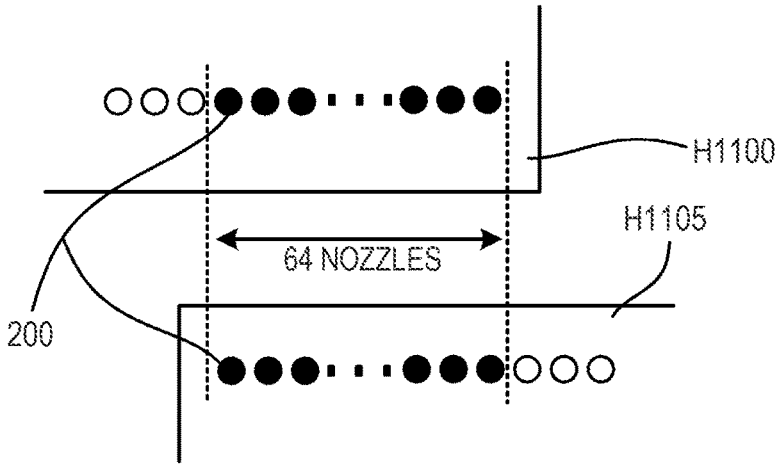
FIG. 8 is a schematic view for illustrating an arrangement mode of nozzles in nozzle arrays forming a recording head 2.

The recording head 2 is a serial head in which a plurality of recording element substrates H1100 and H1105 are arranged in a staggered shape as illustrated in FIG. 6. As illustrated in FIG. 8, the number of overlapping nozzles 200 per nozzle array is 64, and an ink ejection amount per nozzle is 5.0 ng/dot. In addition, the distance between the nozzle arrays is 0.1 inch.

Recording Head 3

The recording head 3 is a line head in which a plurality of recording element substrates H1110 and H1115 are arranged in an in-line shape as illustrated in FIG. 7. As illustrated in FIG. 9, the number of overlapping nozzles 220 per nozzle array is 16, and an ink ejection amount per nozzle is 5.0 ng/dot. In addition, the distance between the nozzle arrays is 0.2 inch.

Recording Head 4

The recording head 4 is a line head in which a plurality of recording element substrates H1110 and H1115 are arranged in an in-line shape as illustrated in FIG. 7. As illustrated in FIG. 9, the number of overlapping nozzles 220 per nozzle array is 16, and an ink ejection amount per nozzle is 10.0 ng/dot. In addition, the distance between the nozzle arrays is 0.1 inch.

Recording Head 5

The recording head 5 is a line head in which a plurality of recording element substrates H1110 and H1115 are arranged in an in-line shape as illustrated in FIG. 7. As illustrated in FIG. 9, the number of overlapping nozzles 220 per nozzle array is 16, and an ink ejection amount per nozzle is 11.0 ng/dot. In addition, the distance between the nozzle arrays is 0.1 inch.

Recording Head 6

The recording head 6 is a serial head in which a plurality of recording element substrates H1100 and H1105 are arranged in a staggered shape as illustrated in FIG. 6. As illustrated in FIG. 8, the number of overlapping nozzles 200 per nozzle array is 64, and an ink ejection amount per nozzle is 11.0 ng/dot. In addition, the distance between the nozzle arrays is 0.1 inch.

Recording Head 7

The recording head 7 is a line head in which a plurality of recording element substrates H1100 and H1105 are arranged in a staggered shape as illustrated in FIG. 6. The number of overlapping nozzles per nozzle array is 0, and an ink ejection amount per nozzle is 5.0 ng/dot. In addition, the distance between the nozzle arrays is 0.1 inch.

Recording Head 8

The recording head 8 is a serial head including one recording element substrate H1100 (FIG. 6) forming the recording head 2. The number of overlapping nozzles per nozzle array is 0, and an ink ejection amount per nozzle is 5.0 ng/dot. In addition, the distance between the nozzle arrays is 0.1 inch.

Recording Head 9

The recording head 9 is a serial head in which a plurality of recording element substrates H1110 and H1115 are arranged in an in-line shape as illustrated in FIG. 7. The number of overlapping nozzles per nozzle array is 0, and an ink ejection amount per nozzle is 5.0 ng/dot. In addition, the distance between the nozzle arrays is 0.1 inch.

Recording Head 10

Figure 10:
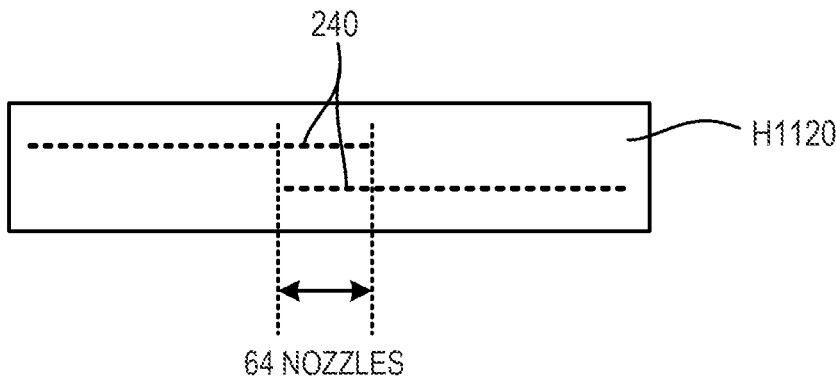
FIG. 10 is a schematic view for illustrating an arrangement mode of nozzles in nozzle arrays forming a recording head 10.

The recording head 10 is a serial head including one recording element substrate H1120 in which two nozzle arrays are arranged so as to be displaced from each other as illustrated in FIG. 10. The number of overlapping nozzles 240 per nozzle array is 64, and an ink ejection amount per nozzle is 5.0 ng/dot. In addition, the distance between the nozzle arrays is 0.1 inch.

Recording Head 11

A recording head 11 of a piezo ink jet system that ejected an ink by applying mechanical energy was prepared. The recording head 11 is a line head which includes a sub-heater for temperature control, and in which a plurality of recording element substrates H1110 and H1115 are arranged in an in-line shape as illustrated in FIG. 7. As illustrated in FIG. 9, the number of overlapping nozzles 220 per nozzle array is 16, and an ink ejection amount per nozzle is 5.0 ng/dot. In addition, the distance between the nozzle arrays is 0.1 inch.

The configuration of each of the recording heads 1 to 10 is shown in Table 4.

TABLE 4

| Configuration of recording head | | | | | | | | | | | |
|---|---|---|---|---|---|---|---|---|---|---|---|
| | Recording head | | | | | | | | | | |
| | 1 | 2 | 3 | 4 | 5 | 6 | 7 | 8 | 9 | 10 | 11 |
| Kind Arrangement mode of recording element substrates | Line In-line shape | Serial Staggered shape | Line In-line shape | Line In-line shape | Line In-line shape | Serial Staggered shape | Line Staggered shape | Serial — | Serial In-line shape | Serial — | Line In-line shape |
| Number of nozzles per nozzle array | 512 | 512 | 512 | 512 | 512 | 512 | 512 | 512 | 512 | 512 | 512 |
| Number of overlapping nozzles per nozzle array | 16 | 64 | 16 | 16 | 16 | 64 | 0 | 0 | 0 | 64 | 16 |
| Ink ejection amount (ng/dot) per nozzle | 5.0 | 5.0 | 5.0 | 10.0 | 11.0 | 11.0 | 5.0 | 5.0 | 5.0 | 5.0 | 5.0 |
| Distance (inch) between nozzle arrays | 0.1 | 0.1 | 0.2 | 0.1 | 0.1 | 0.1 | 0.1 | 0.1 | 0.1 | 0.1 | 0.1 |

Evaluation

The following evaluations were performed through use of the inks prepared in the foregoing. In Examples, the recording duty of an image recorded under such a condition that eight ink droplets of 3.8 ng±10% are applied to a unit region measuring 1/600 inch by 1/600 inch is defined as 100%. In the present invention, in the following evaluation criteria of the respective items, the levels "AA", "A" and "B" were defined as acceptable levels, while the level "C" was defined as an unacceptable level. The evaluation results are shown in Table 5.

Recording of Image

In each of Examples 1 to 5, 8 to 27, and 30 to 32, Comparative Examples 1 to 3, and Reference Examples 1 and 4, an image was recorded through use of an ink jet recording apparatus having a configuration illustrated in FIG. 2 and having mounted thereon each of the recording heads 1, 3 to 5, 7, and 11 that were line heads. The recording head is fixed to the ink jet recording apparatus. In this ink jet recording apparatus, an image is recorded through one relative scanning between the recording head and the recording medium.

In each of Examples 6, 7, 28, and 29 and Reference Examples 2 and 3, an image was recorded through use of an ink jet recording apparatus in which the line head of the ink jet recording apparatus having a configuration illustrated in FIG. 2 was replaced by each of the recording heads 2, 6, and 8 to 10 that were serial heads. In this ink jet recording apparatus, an image is recorded by main scanning of the recording head and conveyance of the recording medium in a sub-scanning direction.

The temperature-control temperature of the recording heads 1 to 10 (heating temperature of the ink) was controlled by energizing a heater of the recording head to such a degree as not to cause the ink to be ejected, and reading the temperature with a diode sensor installed on the recording head. The temperature-control temperature of the recording head 11 (heating temperature of the ink) was controlled by heating the sub-heater for temperature control of the recording head, and reading the temperature with a diode sensor installed on the recording head. In Examples 1 to 32, Comparative Examples 1 to 3, and Reference Example 4, the overlapping nozzles were controlled to eject an ink dividedly from both the adjacent recording element substrates. The ink, the recording head, the temperature-control temperature Th of the recording head, and the application time difference of the ink ejected from the overlapping nozzles are shown in Table 5. The application time difference of the ink ejected from the overlapping nozzles was calculated based on the distance between the nozzle arrays, the speed of relative scanning between the recording head and the recording medium, and the scanning speed of the recording head.

Color Developability

An image including the following gradation pattern was recorded on a recording medium (glossy paper, product name "Canon Photo Paper/Glossy Pro [Platinum Grade] PT-201", manufactured by Canon Inc.) through use of the above-mentioned ink jet recording apparatus. The gradation pattern is formed of a solid image measuring 2 cm by 2 cm in which the application amount of the ink is gradually changed under such a condition that a maximum of six ink droplets are applied to a unit region measuring 1/600 inch by 1/600 inch. After the recorded image was dried for 1 day, a hue angle (H), chroma (C*), and lightness (L*) in a Lab color system were measured with a spectrocolorimeter (product name "X-Rite eXact" (Ml light source), manufactured by X-Rite Inc.). Then, the color developability of the image was evaluated based on the following evaluation criteria. The lightness was evaluated in terms of a value at a chroma of 50. When the maximum chroma did not reach 50, data obtained by subjecting the gradation pattern to color measurement was extrapolated, and the resultant calculated value of lightness was evaluated. The reason for changing the evaluation criteria in accordance with the hue angle is that a suitable color tone perceived visually varies depending on the kind of a color.

Case in which Hue Angle (H) is 0° or More to
Less than 180°

AA: The maximum chroma was 60 or more and the lightness was 80 or more, or the maximum chroma was 55 or more and the lightness was 85 or more.

A: The maximum chroma was 55 or more to less than 60 and the lightness was 80 or more to less than 85

B: The maximum chroma was 50 or more to less than 55 and the lightness was 80 or more to less than 85.

C: The maximum chroma was less than 50 or the lightness was less than 80.

[Case in which Hue Angle (H) is 180° or More to Less than 360°]

AA: The maximum chroma was 60 or more and the lightness was 70 or more, or the maximum chroma was 55 or more and the lightness was 75 or more.

A: The maximum chroma was 55 or more to less than 60 and the lightness was 70 or more to less than 75.

B: The maximum chroma was 50 or more to less than 55 and the lightness was 70 or more to less than 75.

C: The maximum chroma was less than 50 or the lightness was less than 70.

Image Unevenness

The following solid image was recorded on a recording medium (glossy paper, product name "Canon Photo Paper/ Glossy Pro [Platinum Grade] PT-201", manufactured by Canon Inc.) through use of the above-mentioned ink jet recording apparatus. The solid image has a length of 18 cm in the longitudinal direction of the line head or the main scanning direction of the serial head, a length of 10 cm in the conveyance direction of the recording head, and a recording duty of 100%. After 30 minutes from the recording, the state of unevenness in the solid image (mainly overlapping portions) was visually recognized under irradiation with light from each of a fluorescent light and a black light (product name "SLUV-4", manufactured by AS ONE Corporation), and the image unevenness was evaluated based on the following evaluation criteria.

A: No unevenness was observed under irradiation with light from any of the fluorescent light and the black light.

B: No unevenness was observed under irradiation with light from the fluorescent light, but unevenness was observed under irradiation with light from the black light.

C: Unevenness was observed under irradiation with light from each of the fluorescent light and the black light.

TABLE 5

Evaluation conditions and evaluation results

| | | | | Evaluation conditions | | | | Evaluation results | |
| | | | | | | Temperature-control temperature | Number | | |
| | | | | Speed | Application | | | | |
| | | Ink | Recording head | (inch/sec) of relative scanning | time difference (millisecond) | Th (° C.) of recording head | of divided applications | Color develop ability | Image unevenness |
|---|---|---|---|---|---|---|---|---|---|
| Example | 1 | 1 | 1 | 10 | 10 | 40 | 1 | A | A |
| | 2 | 2 | 1 | 10 | 10 | 40 | 1 | A | A |
| | 3 | 3 | 1 | 10 | 10 | 40 | 1 | A | A |
| | 4 | 4 | 1 | 10 | 10 | 40 | 1 | A | A |
| | 5 | 5 | 1 | 10 | 10 | 40 | 1 | A | A |
| | 6 | 1 | 2 | 10 | 10 | 40 | 1 | A | A |
| | 7 | 1 | 2 | 10 | 10 | 40 | 4 | A | A |
| | 8 | 1 | 3 | 10 | 20 | 40 | 1 | A | A |
| | 9 | 1 | 3 | 10 | 1 | 40 | 1 | A | A |
| | 10 | 1 | 4 | 10 | 10 | 40 | 1 | A | A |
| | 11 | 1 | 5 | 10 | 10 | 40 | 1 | A | B |
| | 12 | 1 | 1 | 10 | 10 | 60 | 1 | A | A |
| | 13 | 1 | 1 | 10 | 10 | Absent | 1 | A | B |
| | 14 | 6 | 1 | 10 | 10 | 40 | 1 | A | A |
| | 15 | 7 | 1 | 10 | 10 | 40 | 1 | A | B |
| | 16 | 8 | 1 | 10 | 10 | 40 | 1 | B | A |
| | 17 | 9 | 1 | 10 | 10 | 40 | 1 | A | A |
| | 18 | 10 | 1 | 10 | 10 | 40 | 1 | A | A |
| | 19 | 11 | 1 | 10 | 10 | 40 | 1 | B | A |
| | 20 | 12 | 1 | 10 | 10 | 40 | 1 | A | A |
| | 21 | 13 | 1 | 10 | 10 | 40 | 1 | A | A |
| | 22 | 14 | 1 | 10 | 10 | 40 | 1 | A | A |
| | 23 | 15 | 1 | 10 | 10 | 40 | 1 | A | B |
| | 24 | 16 | 1 | 10 | 10 | 40 | 1 | A | A |
| | 25 | 17 | 1 | 10 | 10 | 40 | 1 | A | A |
| | 26 | 18 | 1 | 10 | 10 | 40 | 1 | B | A |
| | 27 | 19 | 1 | 10 | 10 | 40 | 1 | A | B |
| | 28 | 20 | 6 | 10 | 10 | Absent | 4 | B | B |
| | 29 | 1 | 10 | 10 | 10 | 40 | 1 | A | A |
| | 30 | 24 | 1 | 10 | 10 | 40 | 1 | AA | A |
| | 31 | 25 | 1 | 10 | 10 | 40 | 1 | AA | A |
| | 32 | 1 | 11 | 10 | 10 | 40 | 1 | A | A |

TABLE 5-continued

| | | | | | Evaluation conditions | | | Evaluation results | |
|---|---|---|---|---|---|---|---|---|---|
| | | | | Speed | Application | Temperature-control temperature | Number | | |
| | | Ink | Recording head | (inch/sec) of relative scanning | time difference (millisecond) | Th (° C.) of recording head | of divided applications | Color develop ability | Image unevenness |
| Comparative Example | 1 | 21 | 1 | 10 | 10 | 40 | 1 | A | C |
| | 2 | 22 | 1 | 10 | 10 | 40 | 1 | C | A |
| | 3 | 23 | 1 | 10 | 10 | 40 | 1 | C | A |
| Reference Example | 1 | 1 | 7 | 10 | — | 40 | 1 | A | — |
| | 2 | 1 | 8 | 10 | — | 40 | 1 | A | — |
| | 3 | 1 | 9 | 10 | — | 40 | 1 | A | A |
| | 4 | 1 | 1 | 3.3 | 30 | 40 | 1 | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-098876, filed Jun. 20, 2022, and Japanese Patent Application No. 2023-097947, filed Jun. 14, 2023, which are hereby incorporated by reference herein in their entirety.

What is claimed is:

1. An ink jet recording method comprising:
recording an image on a recording medium through use of an ink jet recording apparatus, the ink jet recording apparatus including:
  an aqueous ink comprising resin particles each dyed with a fluorescent dye; and
  a recording head having a plurality of nozzle arrays each formed by arranging a plurality of nozzles each configured to eject the aqueous ink in a predetermined direction,
wherein the plurality of nozzle arrays comprises a first nozzle array and a second nozzle array arranged so as to be displaced from each other in the predetermined direction in such a manner that end nozzles in the nozzle arrays adjacent to each other form an overlapping portion in a direction intersecting the predetermined direction,
wherein the aqueous ink is ejected from overlapping nozzles at the overlapping portion while the nozzles are allocated to the first nozzle array and the second nozzle array,
wherein an application time difference of the aqueous ink ejected from the overlapping nozzles is 1 millisecond or more to 20 milliseconds or less, and
wherein the application time difference is adjusted based on at least one factor selected from the group consisting of: a distance between the nozzle arrays, a relative scanning speed between the recording head and the recording medium, and a scanning speed of the recording head.

2. The ink jet recording method according to claim 1, wherein the recording head is a line head.

3. The ink jet recording method according to claim 1, wherein the recording head is a serial head configured to apply the aqueous ink to a unit region of the recording medium through one relative scanning with respect to the recording medium.

4. The ink jet recording method according to claim 1, wherein an ejection amount per droplet of the aqueous ink is 10.0 ng or less.

5. The ink jet recording method according to claim 1,
wherein the recording head includes a temperature control mechanism, and
wherein the aqueous ink warmed by the temperature control mechanism inside the recording head is ejected.

6. The ink jet recording method according to claim 5, wherein a temperature-control temperature Th of the recording head and a glass transition temperature Tg of the resin particles satisfy a relationship: Th<Tg.

7. The ink jet recording method according to claim 1, wherein a ratio (% by mass) of the fluorescent dye in the resin particles is 2.0% by mass or more to 8.0% by mass or less.

8. The ink jet recording method according to claim 1,
wherein the aqueous ink further comprises a silicone-based surfactant, and
wherein a content (% by mass) of the silicone-based surfactant in the aqueous ink is 0.1% by mass or more to 3.0% by mass or less with respect to a total mass of the aqueous ink.

9. The ink jet recording method according to claim 1,
wherein the aqueous ink further comprises a water-soluble resin having an anionic group, and
wherein the water-soluble resin is a urethane resin.

10. The ink jet recording method according to claim 9, wherein the urethane resin has a unit derived from a polyester polyol.

11. The ink jet recording method according to claim 10, wherein a content (% by mass) of the urethane resin in the aqueous ink is 0.04 times or more to 1.00 times or less in terms of mass ratio with respect to a content (% by mass) of the resin particles.

12. An ink jet recording apparatus comprising:
an aqueous ink comprising resin particles each dyed with a fluorescent dye; and
a recording head having a plurality of nozzle arrays each formed by arranging a plurality of nozzles each configured to eject the aqueous ink in a predetermined direction,
wherein the plurality of nozzle arrays comprises a first nozzle array and a second nozzle array arranged so as to be displaced from each other in the predetermined direction in such a manner that end nozzles in the nozzle arrays adjacent to each other form an overlapping portion in a direction intersecting the predetermined direction, wherein the ink jet recording apparatus is configured to eject the aqueous ink from overlapping nozzles at the overlapping portion while the nozzles are allocated to the first nozzle array and the second nozzle array, wherein the ink jet recording apparatus is configured to control an application time difference of the aqueous ink ejected from the overlapping nozzles to be 1 millisecond or more to 20 milliseconds or less, and wherein the application time difference is adjusted based on at least one factor selected from the group consisting of: a distance between the nozzle arrays, a relative scanning speed between the recording head and the recording medium, and a scanning speed of the recording head.

* * * * *